US012607854B2

(12) United States Patent
Chen et al.

(10) Patent No.: US 12,607,854 B2
(45) Date of Patent: Apr. 21, 2026

(54) OPTICAL LENS ASSEMBLY AND A HEAD-MOUNTED ELECTRONIC DEVICE

(71) Applicant: NEWMAX TECHNOLOGY CO., LTD., Taichung City (TW)

(72) Inventors: Ping-Yi Chen, Taichung City (TW); Fei-Hsin Tsai, Taichung City (TW); Cong Ge, Guangdong Province (CN)

( * ) Notice: Subject to any disclaimer, the term of this patent is extended or adjusted under 35 U.S.C. 154(b) by 567 days.

(21) Appl. No.: 17/984,237

(22) Filed: Nov. 10, 2022

(65) Prior Publication Data
US 2024/0027731 A1     Jan. 25, 2024

(30) Foreign Application Priority Data
Jul. 22, 2022    (TW) .................................. 111127657

(51) Int. Cl.
*G02B 27/01*     (2006.01)
*G02B 9/10*      (2006.01)
*G02B 17/08*     (2006.01)

(52) U.S. Cl.
CPC ........... *G02B 27/0172* (2013.01); *G02B 9/10* (2013.01); *G02B 17/0856* (2013.01)

(58) Field of Classification Search
CPC ... G02B 27/0172; G02B 9/10; G02B 17/0856
See application file for complete search history.

(56) References Cited

U.S. PATENT DOCUMENTS

| | | | | |
|---|---|---|---|---|
| 5,801,885 | A * | 9/1998 | Togino | G02B 27/0172 |
| | | | | 359/638 |
| 6,563,638 | B2 * | 5/2003 | King | G02B 27/283 |
| | | | | 359/485.05 |
| 11,054,622 | B1 * | 7/2021 | Gollier | G02B 27/0172 |
| 2017/0068100 | A1 * | 3/2017 | Ouderkirk | B29D 11/0073 |
| 2020/0284963 | A1 * | 9/2020 | Yun | G02B 5/3083 |
| 2023/0393384 | A1 * | 12/2023 | Yamanaka | G02B 25/001 |
| 2024/0151979 | A1 * | 5/2024 | Yang | G02B 27/283 |

FOREIGN PATENT DOCUMENTS

| | | | | | |
|---|---|---|---|---|---|
| CN | 110308559 A | * | 10/2019 | ........ | G02B 27/0101 |
| CN | 112799232 A | * | 5/2021 | ........ | G02B 27/0101 |

* cited by examiner

*Primary Examiner* — George G. King
(74) *Attorney, Agent, or Firm* — BruceStone LLP; Joseph A. Bruce

(57) ABSTRACT
An optical lens assembly includes: a first element group, including a first lens group, a partial-reflective-partial-transmissive element and a first optical layer that is located on a visual-side surface of a lens of the first lens group closest to a visual side and includes, in order from the visual side to an image source side, a first absorptive polarizer, a reflective polarizer and a first phase retarder; a second element group, including a second lens group and an image source plane; and a second optical layer, located between the partial-reflective-partial-transmissive element and the image source plane and including, in order from the visual side to the image source side, a second phase retarder and a second absorptive polarizer. When the optical lens assembly satisfies a specific condition, the weight of the device can be reduced, the zoom function can be provided, and the image quality can be ensured.

18 Claims, 11 Drawing Sheets

OPTICAL LENS ASSEMBLY AND A HEAD-MOUNTED ELECTRONIC DEVICE

BACKGROUND

Field of the Invention

The present invention relates to an optical lens assembly and a head-mounted electronic device, and more particularly to an optical lens assembly applicable to head-mounted electronic devices.

Description of Related Art

With the development of the semiconductor industry, the functions of various consumer electronic products are increasingly powerful. Moreover, various services of the software application end emerge. These enables consumers to have more choices. Head-mounted displays emerge when the market is no longer satisfied with handheld electronic products. However, the current head-mounted displays are heavy and have poor image quality.

In addition, existing head-mounted displays are all fixed-focus designs, so users with myopia or hyperopia need to additionally wear their own glasses when using the head-mounted displays. This affects the wearing comfort of head-mounted displays and the experiences in the performance of the head-mounted displays.

The present invention mitigates and/or obviates the aforementioned disadvantages.

SUMMARY

The objective of the present invention is to provide an optical lens assembly and a head-mounted electronic device, which can reduce the weight of the device by folding the light path, provide a zoom function, allow users to use the device without additionally wearing their glasses, and ensure the image quality.

Therefore, an optical lens assembly in accordance with the present invention includes: a first element group including: a first lens group with positive refractive power, including one, two, or three lenses; a first optical layer located on a visual-side surface of the lens of the first lens group which is closest to a visual side and including, in order from the visual side to an image source side: a first absorptive polarizer, a reflective polarizer and a first phase retarder; and a partial-reflective-partial-transmissive element; a second element group including: a second lens group including one, two, or three lenses; and an image source plane; and a second optical layer located between the partial-reflective-partial-transmissive element and the image source plane and including, in order from the visual side to the image source side: a second phase retarder and a second absorptive polarizer, wherein a focal length of the optical lens assembly focusing on a near point is f_N, a focal length of the first lens group is f_G1, a focal length of the second lens group is f_G2, and the following conditions are satisfied: $-0.17<f\_G1/f\_G2<3.27$ and $0.11<f\_N/f\_G1<0.39$. When f_G1/f_G2 is satisfied, the distribution of the refractive power of the optical lens assembly will be more appropriate, and the aberration can be reduced. When f_N/f_G1 is satisfied, the length of the optical lens assembly can be shortened.

Optionally, when the focus of the optical lens assembly changes from the near point to a far point, the first element group moves from the image source side to the visual side relative to the second element group, or the first element group moves from the visual side to the image source side relative to the first element group.

Optionally, the optical lens assembly has a total of three, four or five lenses with refractive power.

Optionally, the second optical layer is disposed in the first element group or the second element group.

Optionally, the focal length of the optical lens assembly focusing on the near point is f_N, a focal length of the optical lens assembly focusing on the far point is f_F, and the following condition is satisfied: $0.63<f\_N/f\_F<1.20$, which is favorable to satisfying the needs of most of presbyopia and myopic human eyes in the zoom range of the optical lens assembly.

Optionally, the focal length of the optical lens assembly focusing on the near point is f_N, the focal length of the optical lens assembly focusing on the far point is f_F, a distance from a visual-side surface of the first absorptive polarizer to the image source plane along an optical axis when the optical lens assembly focuses on the far point is MS1_F, a maximum image-source height of the optical lens assembly is IMH, and the following condition is satisfied: $0.91<f\_N*MS1\_F/(f\_F*IMH)<2.50$, which is favorable to achieving a proper balance between the miniaturization of the optical lens assembly and the size of the light-emitting area of a display in the zoom range of the optical lens assembly.

Optionally, the focal length of the optical lens assembly focusing on the near point is f_N, the focal length of the optical lens assembly focusing on the far point is f_F, a distance from an image source-side surface of the lens of the first lens group which is closest to the image source side, to a visual-side surface of the lens of the second lens group which is closest to the visual side, along the optical axis when the optical lens assembly focuses on the near point is GT12_N, a distance from the image source-side surface of the lens of the first lens group which is closest to the image source side, to the visual-side surface of the lens of the second lens group which is closest to the visual side, along the optical axis when the optical lens assembly focuses on the far point is GT12_F, and the following condition is satisfied: $-0.04<(f\_F-f\_N)/(GT12\_F-GT12\_N)<0.60$, which is favorable to achieving an optimal balance between the performance and the miniaturization of the optical lens assembly in the zoom range of the optical lens assembly.

Optionally, a distance from the visual-side surface of the first absorptive polarizer to the image source-side surface of the lens of the first lens group which is closest to the image source side, along the optical axis is GCT1, a distance from the first absorptive polarizer to the partial-reflective-partial-transmissive element along the optical axis is LBS, and the following condition is satisfied: $0.80<GCT1/LBS<5.01$, which is favorable to the miniaturization of the first lens group.

, the focal length of the first lens group is f_G1, a distance from the image source-side surface of the lens of the first lens group which is closest to the image source side, to the image source plane along the optical axis when the optical lens assembly focuses on the far point is MS2_F, and the following condition is satisfied: $0.08<MS2\_F/f\_G1<0.45$, which is favorable to achieving a proper balance between the lens formability and the refractive power of the first lens group.

Optionally, the distance from the image source-side surface of the lens of the first lens group which is closest to the image source side, to the image source plane along the optical axis when the optical lens assembly focuses on the far point is MS2_F, a distance from the visual-side surface of the lens of the second lens group which is closest to the visual side, to an image source-side surface of the lens of the second lens group which is closest to the image source side, along the optical axis is GCT2, and the following condition is satisfied: 0.98<MS2_F/GCT2<4.20, which is favorable to increasing the zoom range of the optical lens assembly.

Optionally, the focal length of the optical lens assembly focusing on a near point is f_N, a distance from the visual-side surface of the first absorptive polarizer to the image source plane along the optical axis when the optical lens assembly focuses on the near point is MS1_N, and the following condition is satisfied: 0.61<MS1_N/f_N<1.68, which is favorable to maintaining suitable lens formability and an appropriate length of the optical lens assembly.

Optionally, the distance from the visual-side surface of the first absorptive polarizer to the image source-side surface of the lens of the first lens group which is closest to the image source side, along the optical axis is GCT1, the distance from the visual-side surface of the lens of the second lens group which is closest to the visual side, to the image source-side surface of the lens of the second lens group which is closest to the image source side, along the optical axis is GCT2, and the following condition is satisfied: 0.23<GCT2/GCT1<1.86, which is favorable to ensuring that the thicknesses of the lenses can meet the processing requirement of the manufacturing process of the lens device while satisfying the image quality.

Optionally, a radius of curvature of a reflective surface of the partial-reflective-partial-transmissive element is R_BS, the distance from the visual-side surface of the first absorptive polarizer to the image source plane along the optical axis when the optical lens assembly focuses on the near point is MS1_N, and the following condition is satisfied: −3.55<R_BS/(2*MS1_N)<−1.02, which is favorable to achieving an optimal balance between the radii of curvature of the lenses and the miniaturization of the optical lens assembly.

Optionally, the focal length of the second lens group is f_G2, the distance from the image source-side surface of the lens of the first lens group which is closest to the image source side, to the image source plane along the optical axis when the optical lens assembly focuses on the far point is MS2_F, and the following condition is satisfied: −0.02<MS2_F/f_G2<0.62, which is favorable to achieving a proper balance between the lens formability and the refractive power of the second lens group.

Optionally, the distance from the visual-side surface of the lens of the second lens group which is closest to the visual side, to the image source-side surface of the lens of the second lens group which is closest to the image source side, along the optical axis is GCT2, a radius of curvature of the image source-side surface of the lens of the second lens group which is closest to the image source side is G2R2, and the following condition is satisfied: −0.26<GCT2/G2R2<0.01, which is favorable to ensuring that the thicknesses and the radii of curvature of the lenses can meet the processing requirement of the manufacturing process of the lens device while satisfying the image quality.

Optionally, the focal length of the first lens group is f_G1, a radius of curvature of the image source-side surface of the lens of the first lens group which is closest to the image source side is G1R2, and the following condition is satisfied: −2.32<f_G1/G1R2<0, which is favorable to effectively improving the distortion of the optical lens assembly, reducing the aberration of the optical lens assembly, and reducing the sizes of the lenses.

Optionally, the focal length of the second lens group is f_G2, a radius of curvature of the visual-side surface of the lens of the second lens group which is closest to the visual side is G2R1, and the following condition is satisfied: −1.00<f_G2/G2R1<12.27, which is favorable to effectively improving the distortion of the optical lens assembly, reducing the aberration of the optical lens assembly, and reducing the sizes of the lenses.

Optionally, a maximum field of view of the optical lens assembly in the zoom range is FOV_mx, a minimum field of view of the optical lens assembly in the zoom range is FOV_mn, and the following condition is satisfied: 0.80<FOV_mx/FOV_mn<1.52, which is favorable to satisfying the needs of most of presbyopia and myopic human eyes in the zoom range of the optical lens assembly.

Optionally, the distance from the visual-side surface of the first absorptive polarizer to the image source plane along the optical axis when the optical lens assembly focuses on the near point is MS1_N, the distance from the visual-side surface of the first absorptive polarizer to the image source plane along the optical axis when the optical lens assembly focuses on the far point is MS1_F, and the following condition is satisfied: 0.81<MS1_F/MS1_N<1.78, which is favorable to achieving a proper balance among the length, the zoom range and the image quality of the optical lens assembly.

Optionally, the focal length of the optical lens assembly focusing on a near point is f_N, and the following condition is satisfied: 10.79 mm<f_N<32.23 mm.

Optionally, the focal length of the optical lens assembly focusing on the far point is f_F, and the following condition is satisfied: 12.31 mm<f_F<32.16 mm.

Optionally, the focal length of the first lens group is f_G1, and the following condition is satisfied: 39.63 mm<f_G1<125.57 mm.

Optionally, the focal length of the second lens group is f_G2, and the following condition is satisfied: −899.18<f_G2<63.30 mm.

Optionally, the maximum field of view of the optical lens assembly in the zoom range is FOV_mx, and the following condition is satisfied: 79.02°<FOV_mx<109.89°.

Optionally, the minimum field of view of the optical lens assembly in the zoom range is FOV_mn, and the following condition is satisfied: 62.82°<FOV_mn<100.10°.

Moreover, a head-mounted electronic device in accordance with the present invention includes a housing, an optical lens assembly disposed in the housing, an image source disposed on an image source plane of the optical lens assembly in the housing, and a controller disposed in the housing and electrically connected to the image source. The optical lens assembly includes, in order from a visual side to an image source side: a first element group including: a first lens group with positive refractive power, including one, two, or three lenses; a first optical layer located on a visual-side surface of the lens of the first lens group which is closest to the visual side and including, in order from the visual side to the image source side: a first absorptive polarizer, a reflective polarizer and a first phase retarder; and a partial-reflective-partial-transmissive element; a second element group including: a second lens group including one, two, or three lenses; and the image source plane; and a second optical layer including, in order from the visual side to the image source side: a second phase retarder and a second absorptive polarizer, and located between the partial-reflective-partial-transmissive element and the image source plane, wherein a focal length of the optical lens assembly focusing on a near point is f_N, a focal length of the first lens group is f_G1, a focal length of the second lens group is f_G2, and the following conditions are satisfied: −0.17<f_G1/f_G2<3.27 and 0.11<f_N/f_G1<0.39. When f_G1/f_G2 is satisfied, the distribution of the refractive power of the optical lens assembly will be more appropriate, and the aberration can be reduced. When f_N/f_G1 is satisfied, the length of the optical lens assembly can be shortened.

Optionally, when the focus of the optical lens assembly changes from the near point to a far point, the first element group moves from the image source side to the visual side relative to the second element group, or the first element group moves from the visual side to the image source side relative to the first element group.

Optionally, the optical lens assembly has a total of three, four or five lenses with refractive power.

Optionally, the second optical layer is disposed in the first element group or the second element group.

Optionally, the focal length of the optical lens assembly focusing on the near point is f_N, a focal length of the optical lens assembly focusing on a far point is f_F, and the following condition is satisfied: 0.63<f_N/f_F<1.20, which is favorable to satisfying the needs of most of presbyopia and myopic human eyes in the zoom range of the optical lens assembly.

Optionally, the focal length of the optical lens assembly focusing on the near point is f_N, the focal length of the optical lens assembly focusing on the far point is f_F, a distance from a visual-side surface of the first absorptive polarizer to the image source plane along an optical axis when the optical lens assembly focuses on the far point is MS1_F, a maximum image-source height of the optical lens assembly is IMH, and the following condition is satisfied: 0.91<f_N*MS1_F/(f_F*IMH)<2.50, which is favorable to achieving a proper balance between the miniaturization of the optical lens assembly and the size of the light-emitting area of a display in the zoom range of the optical lens assembly.

Optionally, the focal length of the optical lens assembly focusing on the near point is f_N, the focal length of the optical lens assembly focusing on the far point is f_F, a distance from an image source-side surface of the lens of the first lens group which is closest to the image source side, to a visual-side surface of the lens of the second lens group which is closest to the visual side, along the optical axis when the optical lens assembly focuses on the near point is GT12_N, a distance from the image source-side surface of the lens of the first lens group which is closest to the image source side, to the visual-side surface of the lens of the second lens group which is closest to the visual side, along the optical axis when the optical lens assembly focuses on the far point is GT12_F, and the following condition is satisfied: −0.04<(f_F−f_N)/(GT12_F−GT12_N)<0.60, which is favorable to achieving an optimal balance between the performance and the miniaturization of the optical lens assembly in the zoom range of the optical lens assembly.

Optionally, a distance from the visual-side surface of the first absorptive polarizer, to the image source-side surface of the lens of the first lens group which is closest to the image source side, along the optical axis is GCT1, a distance from the first absorptive polarizer to the partial-reflective-partial-transmissive element along the optical axis is LBS, and the following condition is satisfied: 0.80<GCT1/LBS<5.01, which is favorable to the miniaturization of the first lens group.

Optionally, the focal length of the first lens group is f_G1, a distance from the image source-side surface of the lens of the first lens group which is closest to the image source side, to the image source plane along the optical axis when the optical lens assembly focuses on the far point is MS2_F, and the following condition is satisfied: 0.08<MS2_F/f_G1<0.45, which is favorable to achieving a proper balance between the lens formability and the refractive power of the first lens group.

Optionally, the distance from the image source-side surface of the lens of the first lens group which is closest to the image source side, to the image source plane along the optical axis when the optical lens assembly focuses on the far point is MS2_F, a distance from the visual-side surface of the lens of the second lens group which is closest to the visual side, to an image source-side surface of the lens of the second lens group which is closest to the image source side, along the optical axis is GCT2, and the following condition is satisfied: 0.98<MS2_F/GCT2<4.20, which is favorable to increasing the zoom range of the optical lens assembly.

Optionally, the focal length of the optical lens assembly focusing on the near point is f_N, a distance from the visual-side surface of the first absorptive polarizer to the image source plane along the optical axis when the optical lens assembly focuses on the near point is MS1_N, and the following condition is satisfied: 0.61<MS1_N/f_N<1.68, which is favorable to maintaining suitable lens formability and an appropriate length of the optical lens assembly.

Optionally, the distance from the visual-side surface of the first absorptive polarizer, to the image source-side surface of the lens of the first lens group which is closest to the image source side, along the optical axis is GCT1, the distance from the visual-side surface of the lens of the second lens group which is closest to the visual side, to the image source-side surface of the lens of the second lens group which is closest to the image source side, along the optical axis is GCT2, and the following condition is satisfied: 0.23<GCT2/GCT1<1.86, which is favorable to ensuring that the thicknesses of the lenses can meet the processing requirement of the manufacturing process of the lens device while satisfying the image quality.

Optionally, a radius of curvature of a reflective surface of the partial-reflective-partial-transmissive element is R_BS, the distance from the visual-side surface of the first absorptive polarizer to the image source plane along the optical axis when the optical lens assembly focuses on the near point is MS1_N, and the following condition is satisfied: −3.55<R_BS/(2*MS1_N)<−1.02, which is favorable to achieving an optimal balance between the radii of curvature of the lenses and the miniaturization of the optical lens assembly.

Optionally, the focal length of the second lens group is f_G2, the distance from the image source-side surface of the lens of the first lens group which is closest to the image source side, to the image source plane along the optical axis when the optical lens assembly focuses on the far point is MS2_F, and the following condition is satisfied: −0.02<MS2_F/f_G2<0.62, which is favorable to achieving a proper balance between the lens formability and the refractive power of the second lens group.

Optionally, the distance from the visual-side surface of the lens of the second lens group which is closest to the visual side, to the image source-side surface of the lens of the second lens group which is closest to the image source side, along the optical axis is GCT2, a radius of curvature of the image source-side surface of the lens of the second lens group which is closest to the image source side is G2R2, and the following condition is satisfied: −0.26<GCT2/G2R2<0.01, which is favorable to ensuring that the thicknesses and the radii of curvature of the lenses can meet the processing requirement of the manufacturing process of the lens device while satisfying the image quality.

Optionally, the focal length of the first lens group is f_G1, a radius of curvature of the image source-side surface of the lens of the first lens group which is closest to the image source side is G1R2, and the following condition is satisfied: $-2.32<f\_G1/G1R2<0$, which is favorable to effectively improving the distortion of the optical lens assembly, reducing the aberration of the optical lens assembly, and reducing the sizes of the lenses.

Optionally, the focal length of the second lens group is f_G2, a radius of curvature of the visual-side surface of the lens of the second lens group which is closest to the visual side is G2R1, and the following condition is satisfied: $-1.00<f\_G2/G2R1<12.27$, which is favorable to effectively improving the distortion of the optical lens assembly, reducing the aberration of the optical lens assembly, and reducing the sizes of the lenses.

Optionally, a maximum field of view of the optical lens assembly in the zoom range is FOV_mx, a minimum field of view of the optical lens assembly in the zoom range is FOV_mn, and the following condition is satisfied: $0.80<FOV\_mx/FOV\_mn<1.52$, which is favorable to satisfying the needs of most of presbyopia and myopic human eyes in the zoom range of the optical lens assembly.

Optionally, the distance from the visual-side surface of the first absorptive polarizer to the image source plane along the optical axis when the optical lens assembly focuses on the near point is MS1_N, the distance from the visual-side surface of the first absorptive polarizer to the image source plane along the optical axis when the optical lens assembly focuses on the far point is MS1_F, and the following condition is satisfied: $0.81<MS1\_F/MS1\_N<1.78$, which is favorable to achieving a proper balance among the length, the zoom range and the image quality of the optical lens assembly.

Optionally, the focal length of the optical lens assembly focusing on a near point is f_N, and the following condition is satisfied: $10.79$ mm$<f\_N<32.23$ mm.

Optionally, the focal length of the optical lens assembly focusing on the far point is f_F, and the following condition is satisfied: $12.31$ mm$<f\_F<32.16$ mm.

Optionally, the focal length of the first lens group is f_G1, and the following condition is satisfied: $39.63$ mm$<f\_G1<125.57$ mm.

Optionally, the focal length of the second lens group is f_G2, and the following condition is satisfied: $-899.18<f\_G2<63.30$ mm.

Optionally, the maximum field of view of the optical lens assembly in the zoom range is FOV_mx, and the following condition is satisfied: $79.02°<FOV\_mx<109.89°$.

Optionally, the minimum field of view of the optical lens assembly in the zoom range is FOV_mn, and the following condition is satisfied: $62.82°<FOV\_mn<100.10°$.

The present invention will be presented in further details from the following descriptions with the accompanying drawings, which show, for purpose of illustrations only, the preferred embodiments in accordance with the present invention.

8

Figure 1B:
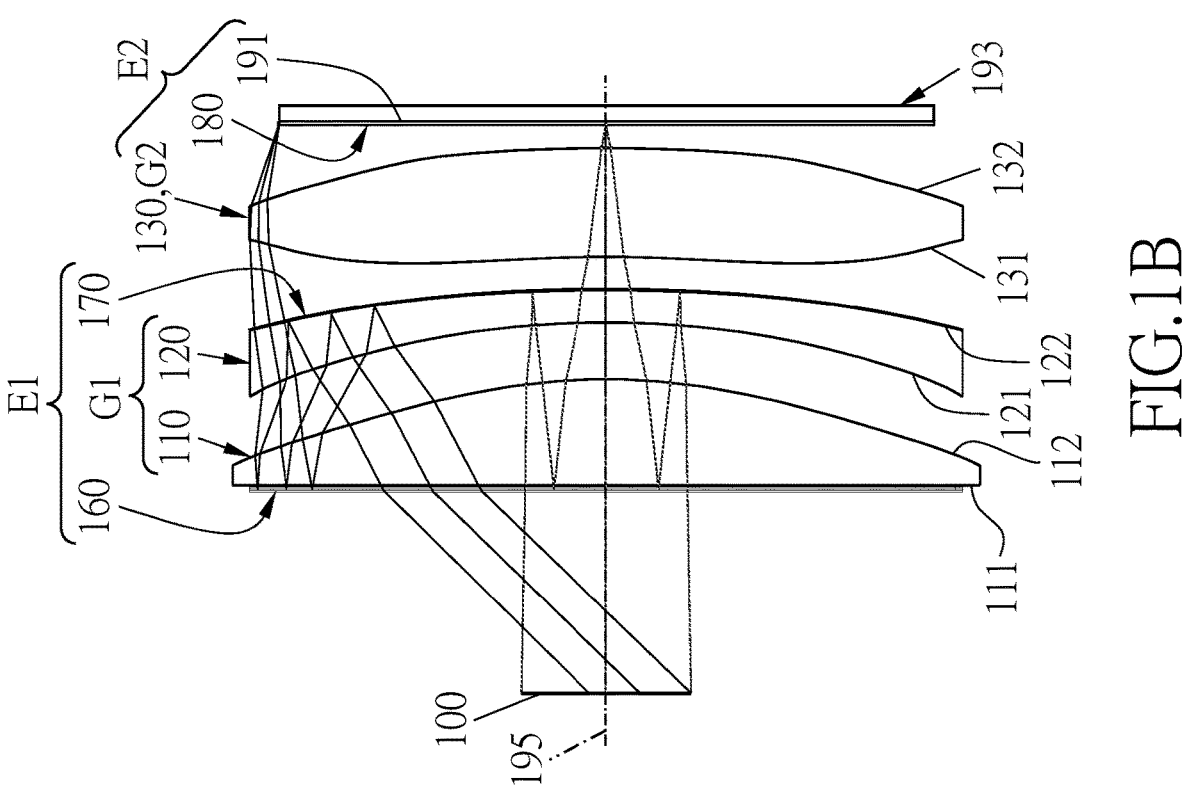
FIG. 1A shows a schematic diagram of an optical lens assembly focusing on a near point in accordance with a first embodiment of the present invention.
Figure 1A:
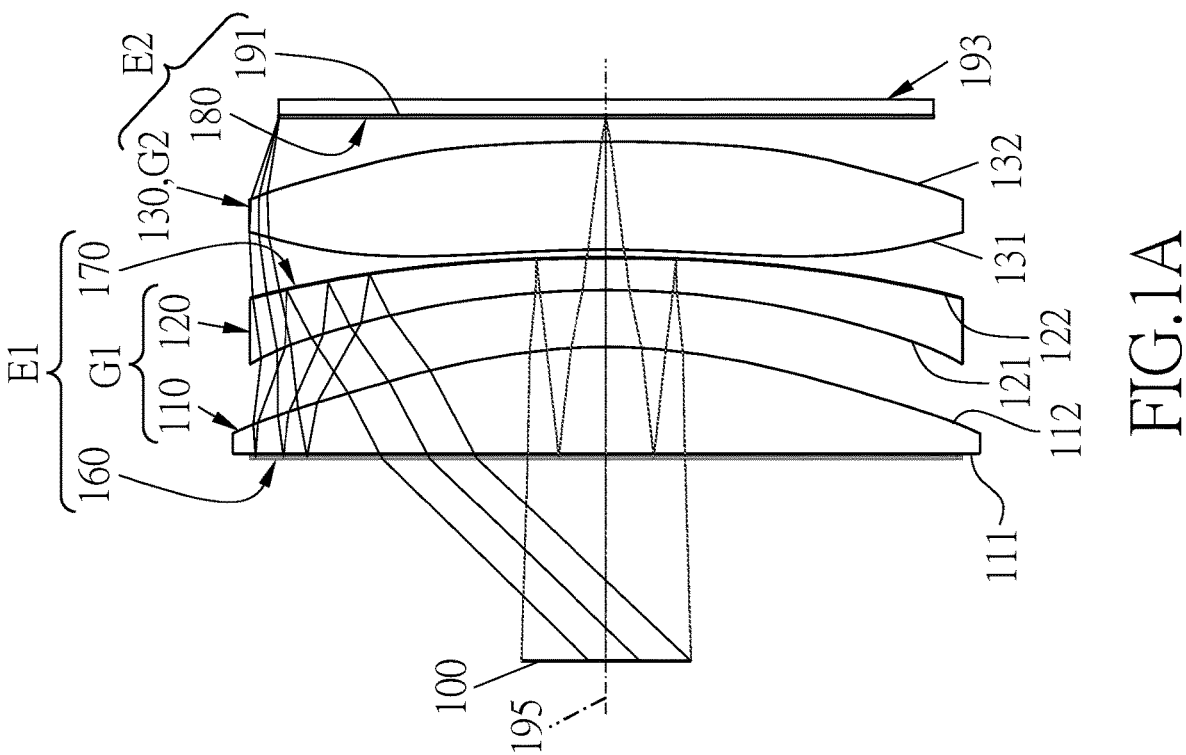
Figure 1C:
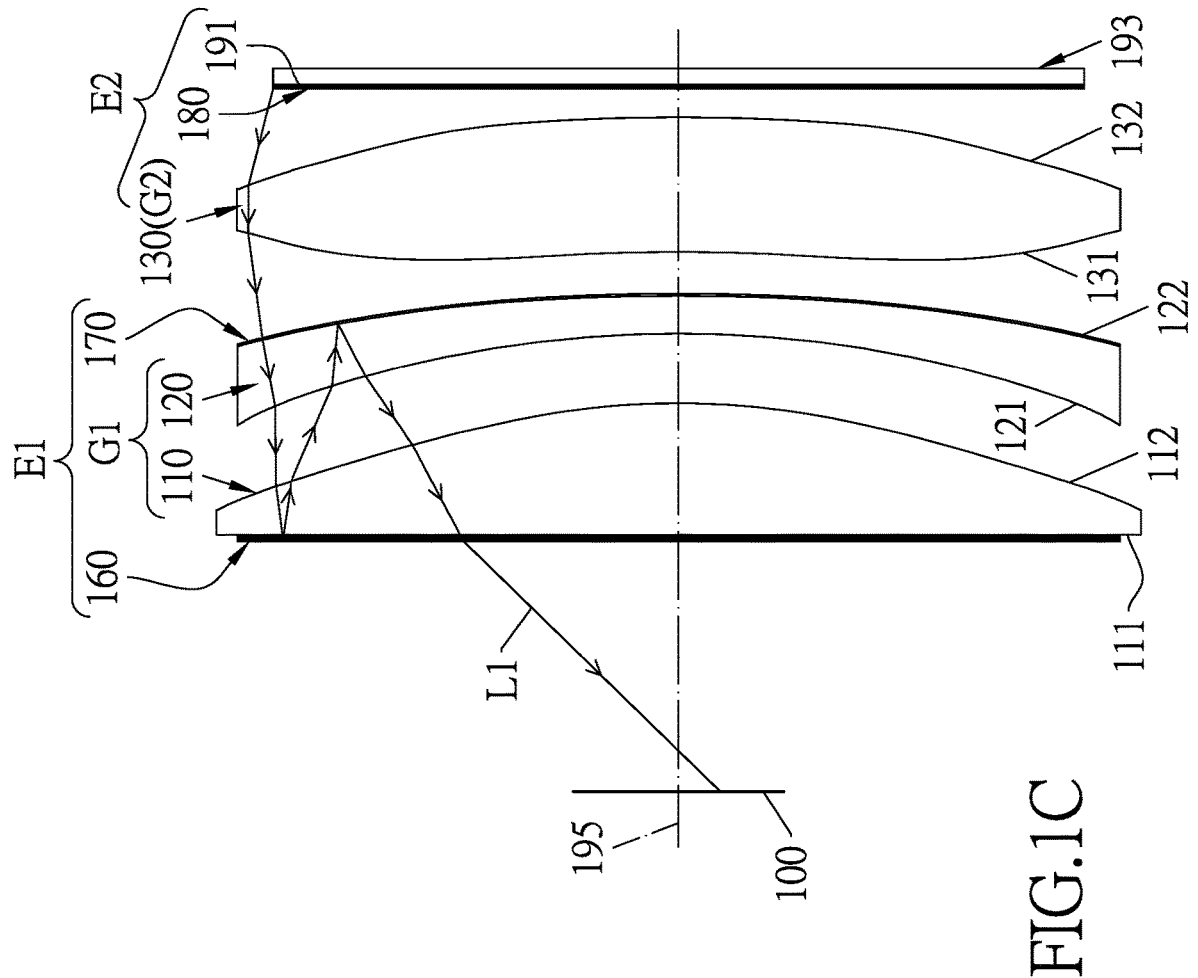
Figure 1D:
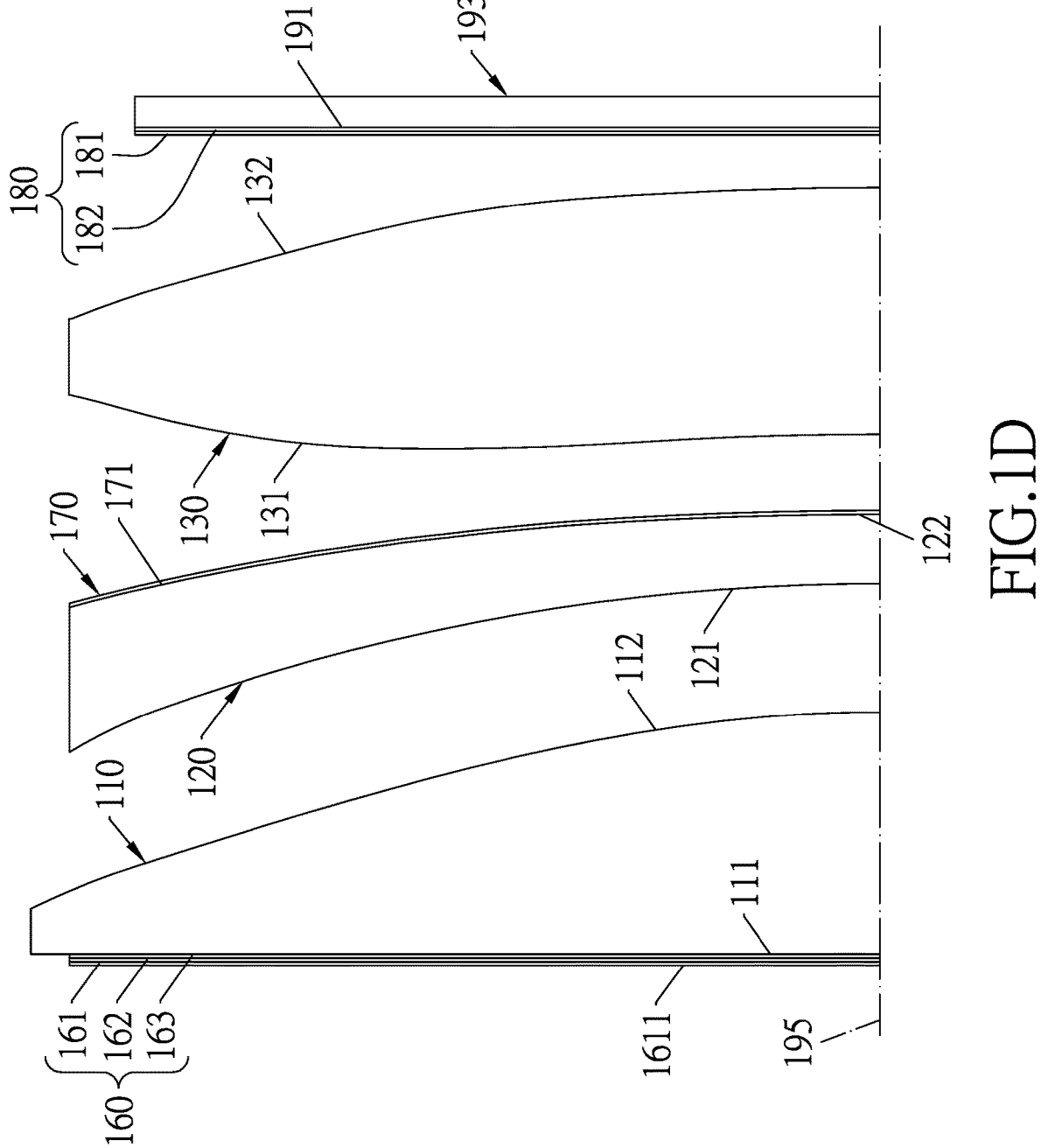
Figures 2A, 2B:
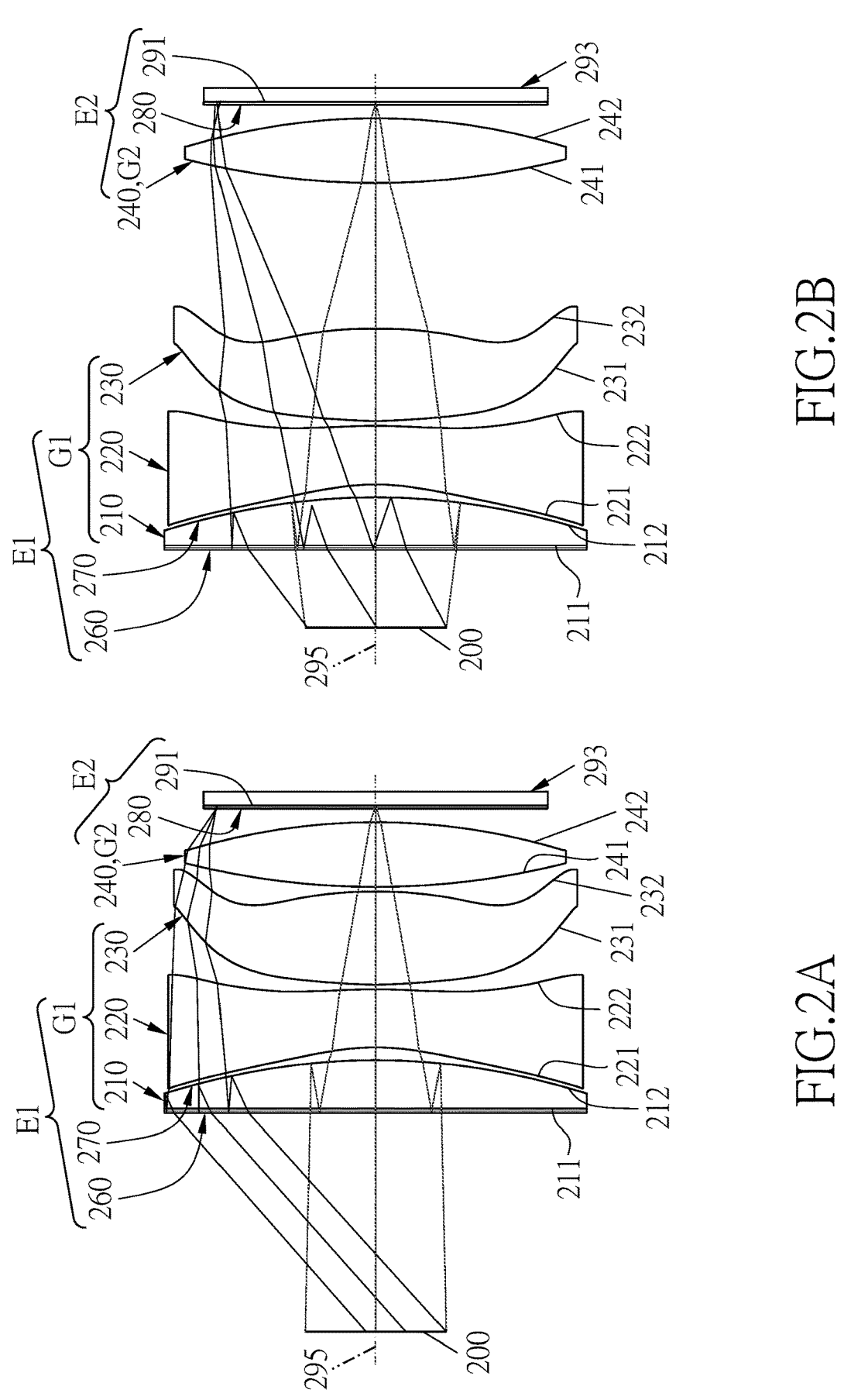
Figures 3A, 3B:
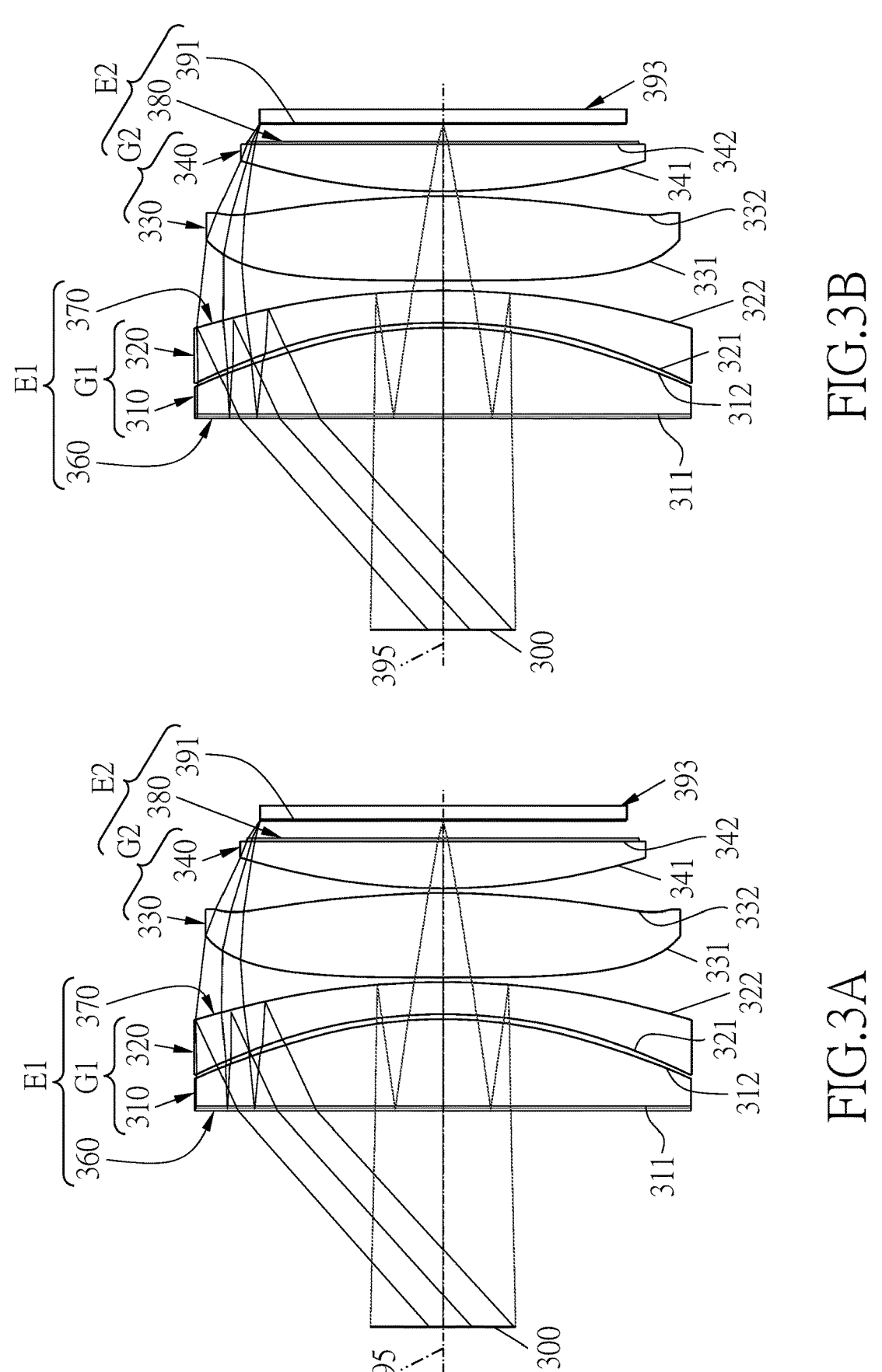
Figures 4A, 4B:
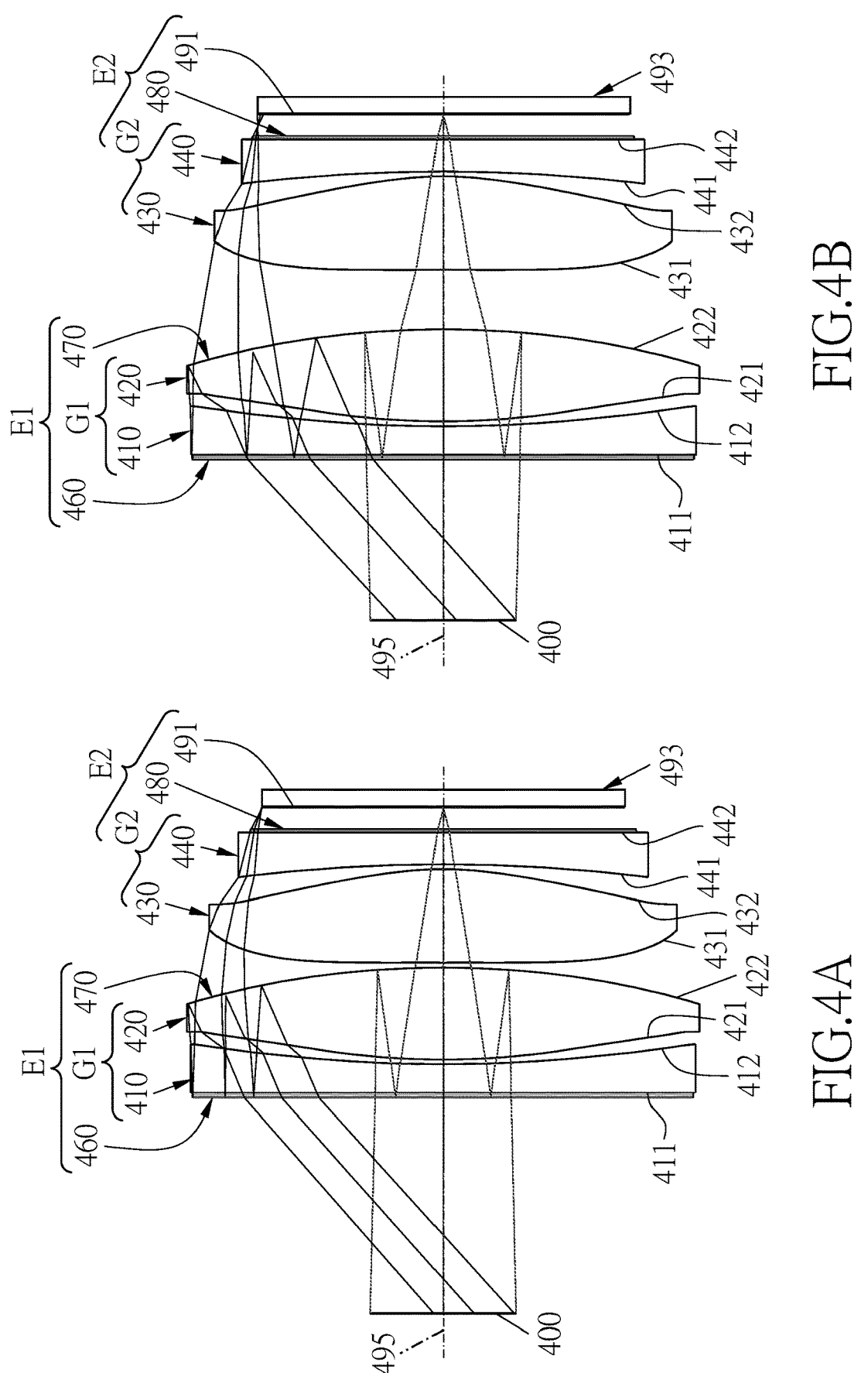
Figures 5A, 5B:
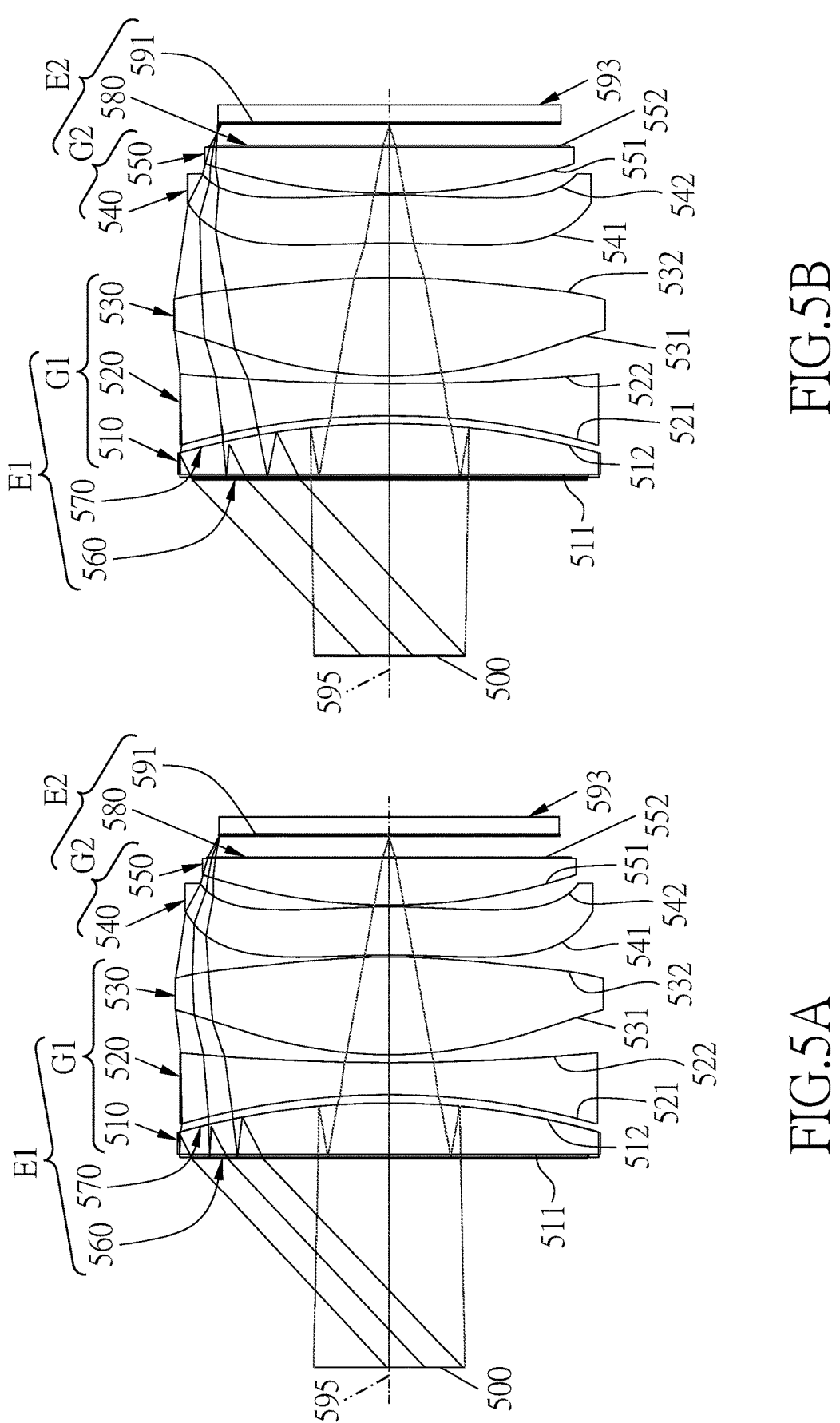
Figures 6A, 6B:
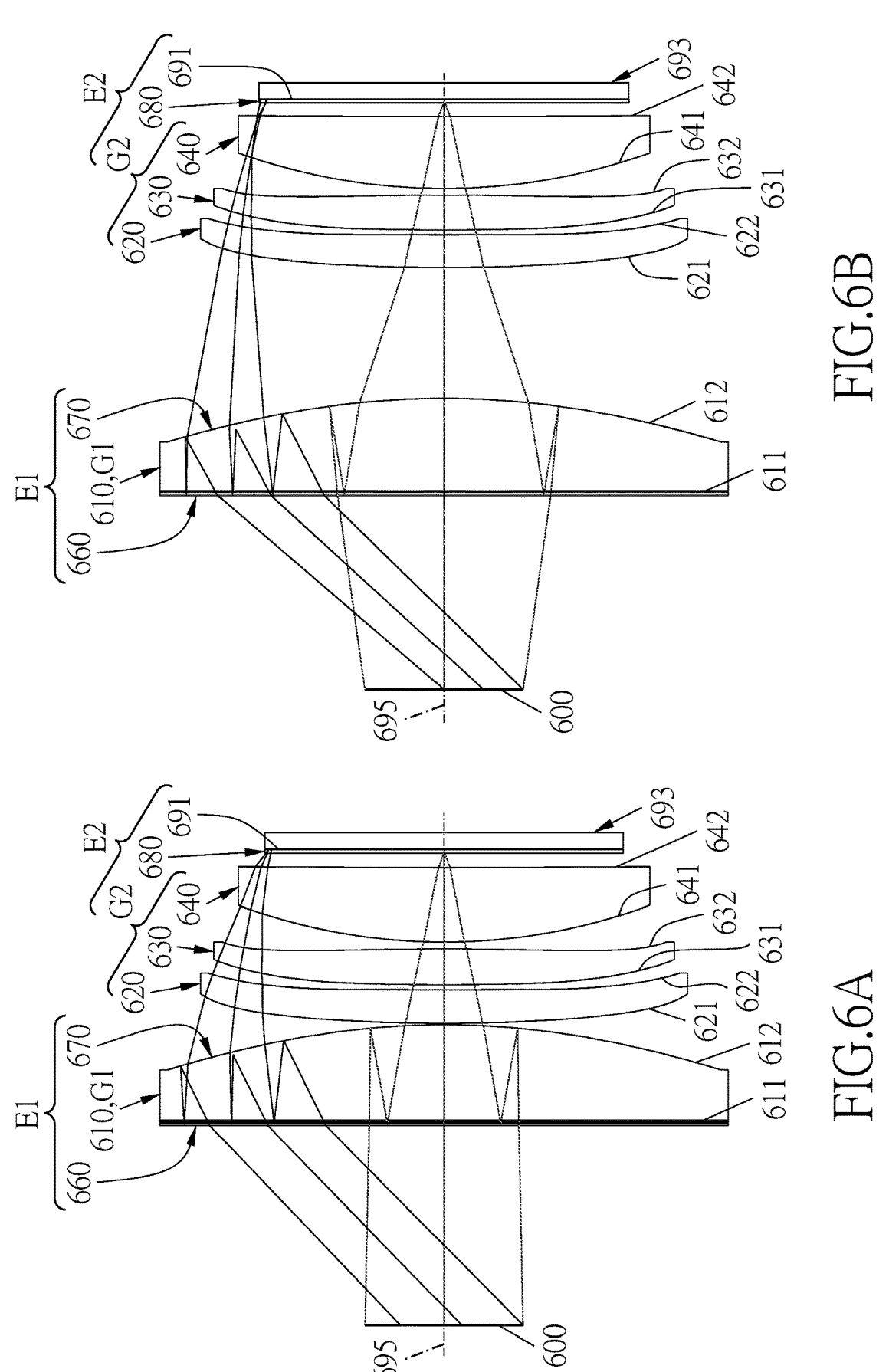
Figures 7A, 7B:
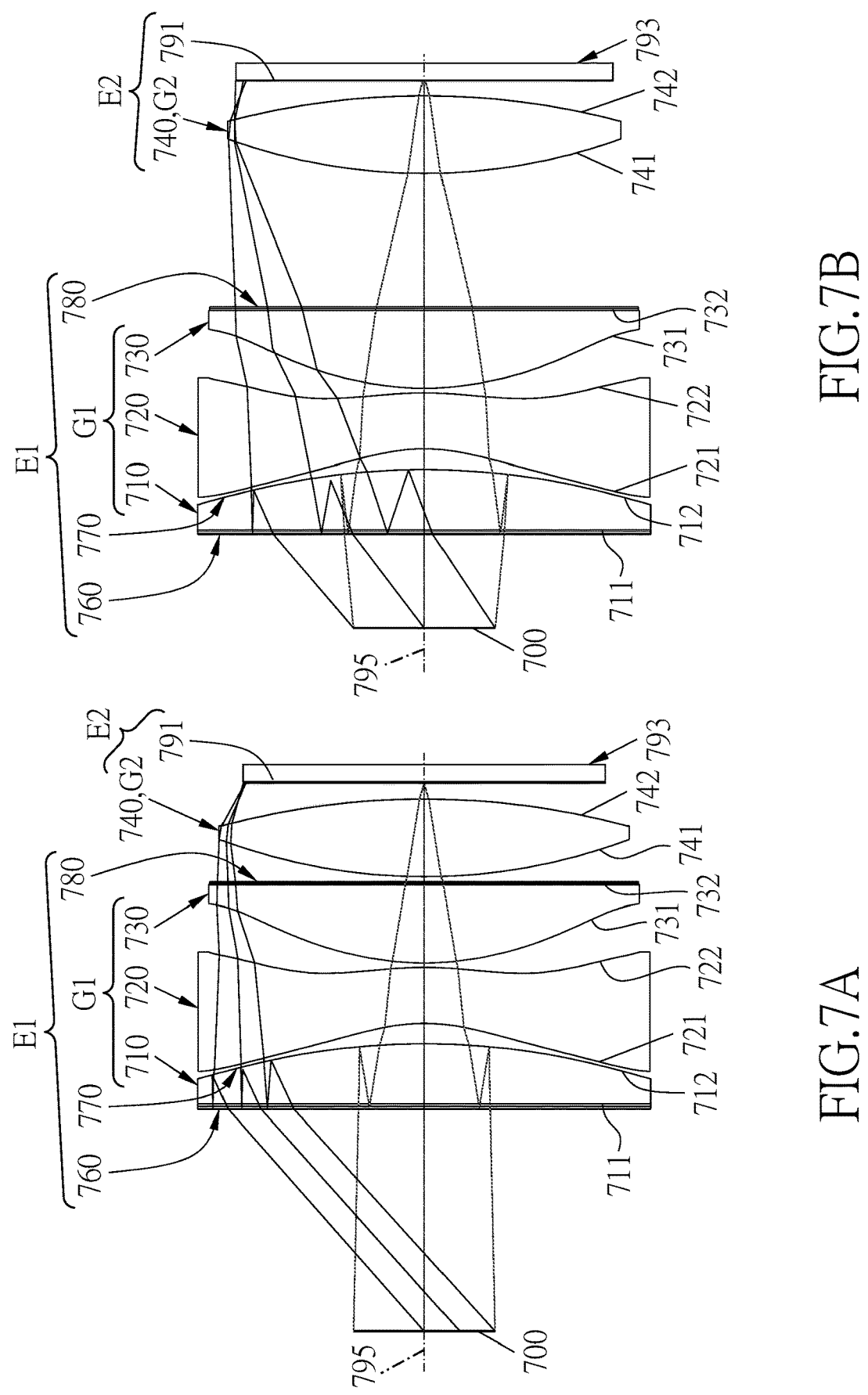
Figures 8A, 8B:
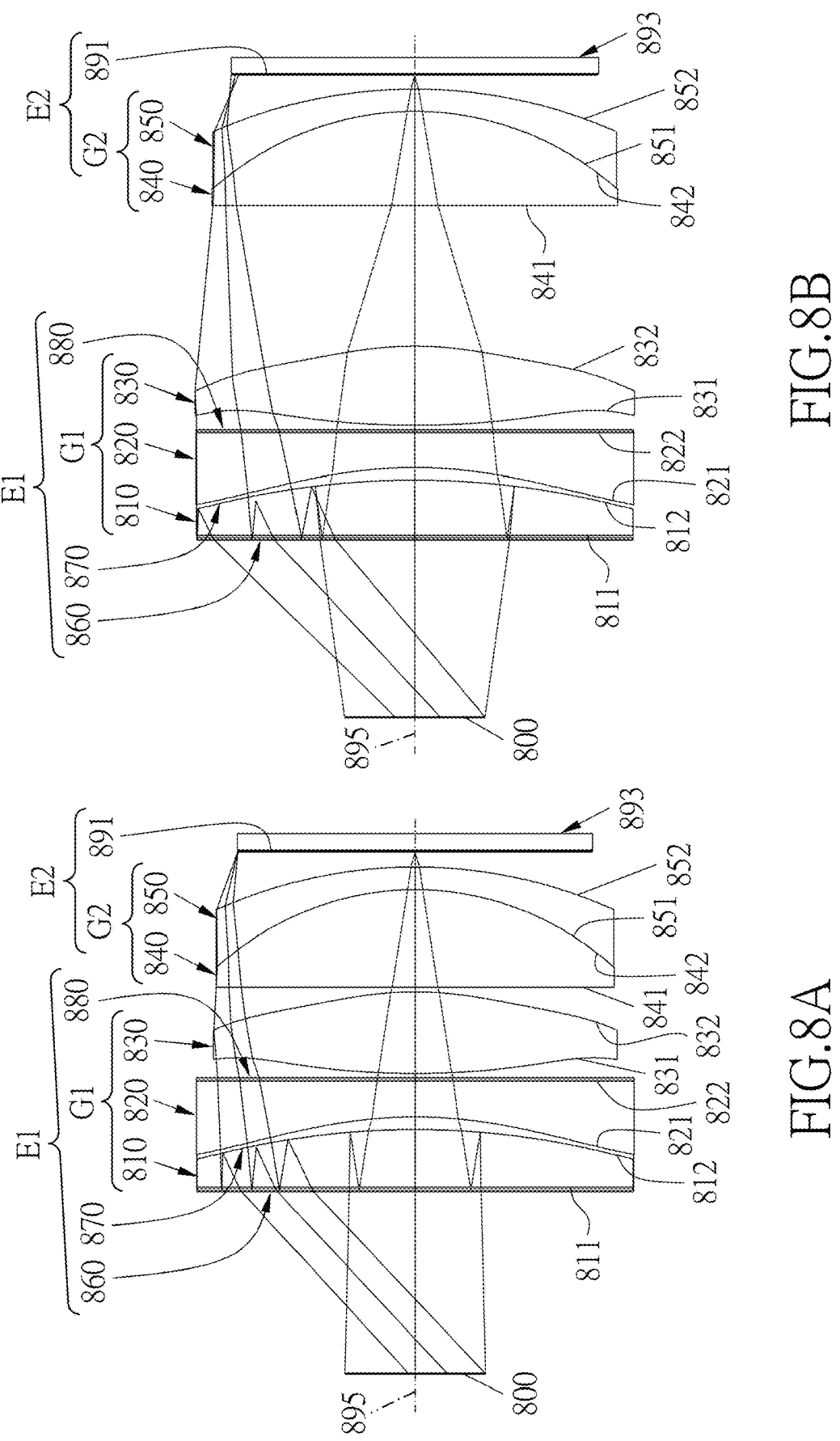
Figure 9:
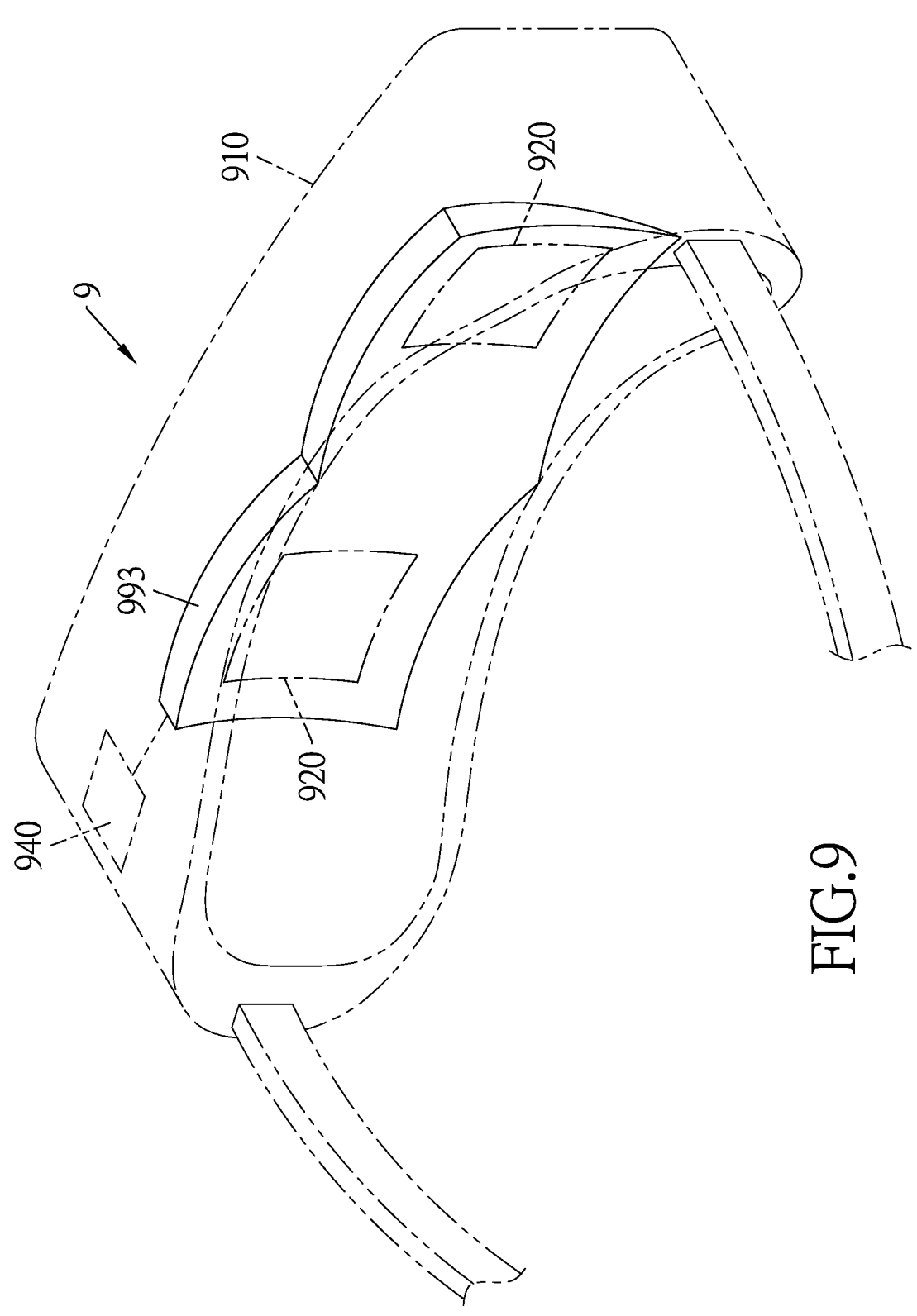

FIG. 1B shows a schematic diagram of the optical lens assembly focusing on a far point in accordance with the first embodiment of the present invention;

FIG. 1C shows a light path of the optical lens assembly of FIG. 1B;

FIG. 1D shows an enlarged view of a part of the optical lens assembly of FIG. 1B;

FIG. 2A shows a schematic diagram of an optical lens assembly focusing on a near point in accordance with a second embodiment of the present invention;

FIG. 2B shows a schematic diagram of the optical lens assembly focusing on a far point in accordance with the second embodiment of the present invention;

FIG. 3A shows a schematic diagram of an optical lens assembly focusing on a near point in accordance with a third embodiment of the present invention;

FIG. 3B shows a schematic diagram of the optical lens assembly focusing on a far point in accordance with the third embodiment of the present invention;

FIG. 4A shows a schematic diagram of an optical lens assembly focusing on a near point in accordance with a fourth embodiment of the present invention;

FIG. 4B shows a schematic diagram of the optical lens assembly focusing on a far point in accordance with the fourth embodiment of the present invention;

FIG. 5A shows a schematic diagram of an optical lens assembly focusing on a near point in accordance with a fifth embodiment of the present invention;

FIG. 5B shows a schematic diagram of the optical lens assembly focusing on a far point in accordance with the fifth embodiment of the present invention;

FIG. 6A shows a schematic diagram of an optical lens assembly focusing on a near point in accordance with a sixth embodiment of the present invention;

FIG. 6B shows a schematic diagram of the optical lens assembly focusing on a far point in accordance with the sixth embodiment of the present invention;

FIG. 7A shows a schematic diagram of an optical lens assembly focusing on a near point in accordance with a seventh embodiment of the present invention;

FIG. 7B shows a schematic diagram of the optical lens assembly focusing on a far point in accordance with the seventh embodiment of the present invention;

FIG. 8A shows a schematic diagram of an optical lens assembly focusing on a near point in accordance with an eighth embodiment of the present invention;

FIG. 8B shows a schematic diagram of the optical lens assembly focusing on a far point in accordance with the eighth embodiment of the present invention; and FIG. 9 shows a schematic diagram of a head-mounted electronic device in accordance with an embodiment of the present invention.

DETAILED DESCRIPTION

First Embodiment

Referring to FIGS. 1A-1D, an optical lens assembly in accordance with a first embodiment of the present invention includes, in order from a visual side to an image source side along an optical axis 195: a stop 100, a first element group E1 and a second element group E2. The stop 100 may be located in a position where the user's eyes view a virtual image. When the focus of the optical lens assembly is changed from a near point to a far point, the second element group E2 moves from the visual side to the image source side relative to the first element group E1. The optical lens assembly has a total of three lenses with refractive power, but is not limited thereto.

The first element group E1 includes a first lens group G1, a first optical layer 160 and a partial-reflective-partial-transmissive element 170.

The first lens group G1 with positive refractive power is located between the first optical layer 160 and the partial-reflective-partial-transmissive element 170, and includes, in order from the visual side to the image source side along the optical axis 195: a first lens 110 and a second lens 120.

The first lens 110 includes a visual-side surface 111 and an image source-side surface 112, the visual-side surface 111 of the first lens 110 is flat in a paraxial region thereof, the image source-side surface 112 of the first lens 110 is convex in a paraxial region thereof, the image source-side surface 112 of the first lens 110 is aspheric, and the first lens 110 is made of plastic.

The second lens 120 includes a visual-side surface 121 and an image source-side surface 122, the visual-side surface 121 of the second lens 120 is concave in a paraxial region thereof, the image source-side surface 122 of the second lens 120 is convex in a paraxial region thereof, the visual-side surface 121 and the image source-side surface 122 of the second lens 120 are aspheric, and the second lens 120 is made of plastic.

The first optical layer 160 is located on the visual-side surface 111 of the first lens 110 and includes, in order from the visual side to the image source side along the optical axis 195: a first absorptive polarizer 161, a reflective polarizer 162 and a first phase retarder 163. The opposite two surfaces of each of these three elements are flat, and these three elements are stacked. Specifically, the first phase retarder 163 is located on the visual-side surface 111, the reflective polarizer 162 is located on the first phase retarder 163, and the first absorptive polarizer 161 is located on the reflective polarizer 162. The first phase retarder 163 is, for example, but not limited to, a quarter-wave plate.

The partial-reflective-partial-transmissive element 170 is located on the image source-side surface 122 of the second lens 120 and has an average light reflectance of at least 30%, preferably 50%, in the visible light range. The average light reflectance here is an average value of different reflectance of the partial-reflective-partial-transmissive element 170 for different wavelengths.

The second element group E2 includes a second lens group G2, a second optical layer 180 and an image source plane 191. The optical lens assembly works in cooperation with an image source 193 disposed on the image source plane 191. The type of the image source 193 may be a liquid crystal display, an OLED display, or a LED display, but is not limited thereto.

The second lens group G2 with negative refractive power is located between the partial-reflective-partial-transmissive element 170 and the second optical layer 180, and includes only a third lens 130. The third lens 130 includes a visual-side surface 131 and an image source-side surface 132, the visual-side surface 131 of the third lens 130 is concave in a paraxial region thereof, the image source-side surface 132 of the third lens 130 is convex in a paraxial region thereof, the visual-side surface 131 and the image source-side surface 132 of the third lens 130 are aspheric, and the third lens 130 is made of plastic.

The second optical layer 180 is located on the image source plane 191 and includes, in order from the visual side to the image source side along the optical axis 195: a second phase retarder 181 and a second absorptive polarizer 182.

The opposite two surfaces of each of these two elements are flat, and these two elements are stacked. Specifically, the second absorptive polarizer 182 is located on the image source plane 191, and the second phase retarder 181 is located on the second absorptive polarizer 182. The second phase retarder 181 is, for example, but not limited to, a quarter-wave plate.

The curve equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot \left(h^i\right)$$

wherein:

z represents the value of a reference position at a height of h with respect to a vertex of the surface of a lens along the optical axis 195;

c represents a paraxial curvature (i.e., a curvature of a lens surface in a paraxial region thereof) equal to 1/R (R: a paraxial radius of curvature);

h represents a vertical distance from the point on the curve of the aspheric surface to the optical axis 195;

k represents the conic constant; and $A_i$ represents the ith-order aspheric coefficient.

In the first embodiment, a focal length of the optical lens assembly focusing on the near point is f_N, a focal length of the optical lens assembly focusing on the far point is f_F, a focal length of the first lens group is f_G1, a focal length of the second lens group is f_G2, a distance from an image source-side surface of the lens of the first lens group G1 which is closest to the image source side, to a visual-side surface of the lens of the second lens group G2 which is closest to the visual side, along the optical axis 195 when the optical lens assembly focuses on the near point is GT12_N, a distance from the image source-side surface of the lens of the first lens group G1 which is closest to the image source side, to the visual-side surface of the lens of the second lens group G2 which is closest to the visual side, along the optical axis 195 when the optical lens assembly focuses on the far point is GT12_F, a maximum field of view of the optical lens assembly in a zoom range is FOV_mx, a minimum field of view of the optical lens assembly in the zoom range is FOV_mn, a distance from a visual-side surface 1611 of the first absorptive polarizer 161 to the image source-side surface of the lens of the first lens group G1 which is closest to the image source side, along the optical axis 195 is GCT1, a distance from the visual-side surface of the lens of the second lens group G2 which is closest to the visual side, to an image source-side surface of the lens of the second lens group G2 which is closest to the image source side, along the optical axis 195 is GCT2, a distance from the visual-side surface 1611 of the first absorptive polarizer 161 to the image source plane 191 along the optical axis 195 when the optical lens assembly focuses on the near point is MS1_N, a distance from the visual-side surface 1611 of the first absorptive polarizer 161 to the image source plane 191 along the optical axis 195 when the optical lens assembly focuses on the far point is MS1_F, a distance from the image source-side surface of the lens of the first lens group G1 which is closest to the image source side, to the image source plane 191 along the optical axis 195 when the optical lens assembly focuses on the far point is MS2_F, a distance from the first absorptive polarizer 161 to the partial-reflective-partial-transmissive element 170 along the optical axis 195 is LBS, a radius of curvature of the image source-side surface of the lens of the first lens group G1 which is closest to the image source side is G1R2, a radius of curvature of the visual-side surface of the lens of the second lens group G2 which is closest to the visual side is G2R1, a radius of curvature of the image source-side surface of the lens of the second lens group G2 which is closest to the image source side is G2R2, a radius of curvature of a reflective surface 171 of the partial-reflective-partial-transmissive element 170 is R_BS, a maximum image-source height of the optical lens assembly is IMH (usually denotes the radius of the incircle of the image source plane 191), the numerical values of these parameters are shown in Table 1, and these parameters meet the conditions in table 2.

TABLE 1

| f_N [mm] | 26.86 | FOV_mn [°] | 90.6 | LBS [mm] | 11.86 |
|---|---|---|---|---|---|
| f_F [mm] | 26.80 | GCT1 [mm] | 11.86 | G1R1 [mm] | infinity |
| f_G1 [mm] | 104.64 | GCT2 [mm] | 6.43 | G1R2 [mm] | −120.42 |
| f_G2 [mm] | −749.31 | MS1_N [mm] | 20.36 | G2R1 [mm] | −73.26 |
| GT12_N [mm] | 0.50 | MS1_F [mm] | 21.86 | G2R2 [mm] | −91.88 |
| GT12_F [mm] | 2.00 | MS2_N [mm] | 8.50 | R_BS [mm] | −120.42 |
| FOV_mx [°] | 91.1 | MS2_F [mm] | 10.00 | IMH [mm] | 19.25 |

TABLE 2

| f_G1/f_G2 | −0.14 | GCT2/GCT1 | 0.54 |
|---|---|---|---|
| f_N/f_G1 | 0.26 | R_BS/(2*MS1_N) | −2.96 |
| f_N/f_F | 1.00 | MS2_F/f_G2 | −0.01 |
| f_N*MS1_F/(f_F*IMH) | 1.14 | GCT2/G2R2 | −0.07 |
| (f_F-f_N)/(GT12_F-GT12_N) | −0.04 | f_G1/G1R2 | −0.87 |
| GCT1/LBS | 1.00 | f_G2/G2R1 | 10.23 |
| MS2_F/f_G1 | 0.10 | FOV_mx/FOV_mn | 1.01 |
| MS2_F/GCT2 | 1.56 | MS1_F/MS1_N | 1.07 |
| MS1_N/f_N | 0.76 — | | — |

The optical lens assembly of the first embodiment utilizes the configuration and arrangement of the absorptive polarizers, the reflective polarizer, the phase retarders, the partial-reflective-partial-transmissive element and the lenses to fold the light path thereof by the transmission and reflection of light to shorten the length of the optical lens assembly required for forming a virtual image without affecting the image quality. Referring to FIGS. 1C and 1D, the unpolarized incident light emitted by the image source 193 travels along a light path L1 to the eyes of the user. Specifically, the unpolarized incident light turns to the circularly-polarized light when passing through the second optical layer 180, and a component of the circularly-polarized light serving as a circularly-polarized transmitted light component passes through the partial-reflective-partial-transmissive element 170 and then travels to the first phase retarder 163 when the circularly-polarized light travels to the partial-reflective-partial-transmissive element 170 upon passing through the second lens group G2. When the circularly-polarized transmitted light component traveling to the first phase retarder 163 passes through the first phase retarder 163, this circularly-polarized transmitted light component turns to a linearly-polarized light component to have a polarization direction parallel to the reflection axis of the reflective polarizer 162. This linearly-polarized light component leaving the first phase retarder 163 is then reflected back to the first phase retarder 163 by the reflective polarizer 162 to pass through the first phase retarder 163 and return to a circularly-polarized light component. Then, when the circularly-polarized light component departing from the first phase retarder 163 travels to the partial-reflective-partial-transmissive element 170, a portion of the circularly-polarized light component is reflected as a reflected light component by the partial-reflective-partial-transmissive element 170 to pass through the first phase retarder 163 and turn from the circularly polarized state to the linearly polarized state to have a polarization direction perpendicular to the reflection axis of the reflective polarizer 162. Finally, the reflected light component in the linearly polarized state travels to the user's eyes to form the virtual image after passing through reflective polarizer 162 and the first absorptive polarizer 161.

The detailed optical data of the respective elements in the optical lens assembly of the first embodiment is shown in Table 3, and the aspheric surface data of the lenses in the first embodiment is shown in Table 4.

TABLE 3

Near point: f_N(focal length) = 26.86 mm, EPD(entrance pupil diameter) = 10.00 mm,
FOV_N(field of view) = 91.1°
Far point: f_F(focal length) = 26.80 mm, EPD (entrance pupil diameter) = 10.00 mm,
FOV_F(field of view) = 90.6°

| Surface | | Curvature Radius | Thickness/gap | Refractive Index (nd) | Abbe number (vd) | Refraction/ reflection |
|---|---|---|---|---|---|---|
| 0 | Stop | infinity | 12.000(Near point) 12.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 6.300 | 1.546 | 56.0 | refraction |
| 5 | | −35.421 | 3.356 | — | — | refraction |
| 6 | Second lens | −56.597 | 1.900 | 1.657 | 20.9 | refraction |
| 7 | Partial-reflective-partial-transmissive element | −120.419 | −1.900 | mirror | | reflection |
| 8 | | −56.597 | −3.356 | — | — | refraction |
| 9 | First lens | −35.421 | −6.300 | 1.546 | 56.0 | refraction |
| 10 | First phase retarder | infinity | −0.100 | 1.533 | 56.0 | refraction |
| 11 | Reflective polarizer | infinity | −0.100 | 1.533 | 56.0 | refraction |
| 12 | Reflective polarizer | infinity | 0.100 | mirror | | reflection |
| 13 | First phase retarder | infinity | 0.100 | 1.533 | 56.0 | refraction |
| 14 | First lens | infinity | 6.300 | 1.546 | 56.0 | refraction |

TABLE 3-continued

Near point: f_N(focal length) = 26.86 mm, EPD(entrance pupil diameter) = 10.00 mm,
FOV_N(field of view) = 91.1°
Far point: f_F(focal length) = 26.80 mm, EPD (entrance pupil diameter) = 10.00 mm,
FOV_F(field of view) = 90.6°

| Surface | | Curvature Radius | Thickness/gap | Refractive Index (nd) | Abbe number (vd) | Refraction/ reflection |
|---|---|---|---|---|---|---|
| 15 | | −35.421 | 3.356 | — | — | refraction |
| 16 | Second lens | −56.597 | 1.900 | 1.657 | 20.9 | refraction |
| 17 | Partial-reflective-partial-transmissive element | −120.419 | 0.500(Near point) 2.000(Far point) | — | — | refraction |
| 18 | Third lens | −73.256 | 6.430 | 1.546 | 56.0 | refraction |
| 19 | | −91.879 | 1.370 | — | — | refraction |
| 20 | Second phase retarder | infinity | 0.100 | 1.533 | 56.0 | refraction |
| 21 | Second absorptive polarizer | infinity | 0.100 | 1.533 | 56.0 | refraction |
| 22 | Image source plane | infinity | — | — | — | — |

Note:
the reference wavelength is 530 nm

TABLE 4

| Surface | 4, 10, 14 | 5, 9, 15 | 6, 8, 16 |
|---|---|---|---|
| K: | 0.0000E+00 | −1.0556E+01 | −2.6475E+01 |
| A2: | 0.0000E+00 | 0.0000E+00 | 0.0000E+00 |
| A4: | 0.0000E+00 | −1.2678E−05 | −1.9605E−05 |
| A6: | 0.0000E+00 | 4.4293E−08 | 3.3232E−08 |
| A8: | 0.0000E+00 | −6.4710E−11 | 3.6785E−11 |
| A10: | 0.0000E+00 | 6.2468E−14 | −1.6518E−13 |
| A12: | 0.0000E+00 | −7.4895E−17 | 5.7308E−17 |
| A14: | 0.0000E+00 | 0.0000E+00 | 0.0000E+00 |
| A16: | 0.0000E+00 | 0.0000E+00 | 0.0000E+00 |
| A18: | 0.0000E+00 | 0.0000E+00 | 0.0000E+00 |
| A20: | 0.0000E+00 | 0.0000E+00 | 0.0000E+00 |

| Surface | 7, 17 | 18 | 19 |
|---|---|---|---|
| K: | 9.5622E+00 | 0.0000E+00 | 0.0000E+00 |
| A2: | 0.0000E+00 | 0.0000E+00 | 0.0000E+00 |
| A4: | −4.4194E−06 | 4.0062E−05 | 3.3018E−05 |
| A6: | 1.9011E−09 | −1.1039E−07 | −5.0162E−07 |
| A8: | 4.1149E−11 | 2.7956E−10 | 2.2150E−09 |
| A10: | −1.1446E−13 | −2.8765E−13 | −4.0985E−12 |
| A12: | 8.6920E−17 | 0.0000E+00 | 2.7419E−15 |
| A14: | 0.0000E+00 | 0.0000E+00 | 0.0000E+00 |
| A16: | 0.0000E+00 | 0.0000E+00 | 0.0000E+00 |
| A18: | 0.0000E+00 | 0.0000E+00 | 0.0000E+00 |
| A20: | 0.0000E+00 | 0.0000E+00 | 0.0000E+00 |

In Table 3, the units of the radius of curvature, the thickness and the focal length are expressed in mm, and the surface numbers 22-0 respectively represent the surfaces where light travels to, from the image source plane 191 to the stop 100, wherein the surface 0 represents a gap between the stop 100 (or the user's eye) and the first absorptive polarizer 161 along the optical axis 195; the surfaces 1, 18, 20 and 21 represent the thicknesses of the first absorptive polarizer 161, the third lens 130, the second phase retarder 181 and the second absorptive polarizer 182 along the optical axis 195, respectively; the surfaces 2, 11 and 12 represent the thickness of the reflective polarizer 162 along the optical axis 195; the surfaces 3, 10 and 13 represent the thickness of the first phase retarder 163 along the optical axis 195; the surfaces 4, 9 and 14 represent the thickness of the first lens 110 along the optical axis 195; the surfaces 5, 8 and 15 represents a gap between the first lens 110 and the second lens 120 along the optical axis 195; the surfaces 6 and 16 represent the thickness of the second lens 120 along the optical axis 195; the surface 7 represents the thickness of the second lens 120 along the optical axis 195, which is equivalent to a distance that the light is reflected by the partial-reflective-partial-transmissive element 170 to travel along the optical axis 195 in the second lens 120; the surface 17 represents a gap between the second lens 120 and the third lens 130 along the optical axis 195; the surface 19 represents a gap between the third lens 130 and the second phase retarder 181 along the optical axis 195; the surface 22 represents a gap between the second absorptive polarizer 182 and the image source plane 191 along the optical axis 195; and the values of the parameters having a negative sign in the table 3 represent light reflective transmission.

In table 4, k represents the conic constant of the curve equation of aspheric surface profiles, and A2, A4, A6, A8, A10, A12, A14, A16, A18, and A20 represent the high-order aspheric coefficients.

The values of the parameters in Table 1 can be calculated from Tables 3 and 4.

The respective tables presented below for respective one of other embodiments are based on the schematic view of this embodiment, and the definitions of parameters in the tables are the same as those in Tables 1, 2 and 4 of the first embodiment. Therefore, an explanation in this regard will not be provided again. The definition of the surface numbers in Table 3 may change with the number of lenses and the position of the optical elements in the embodiments, and the relevant description of the embodiments may be referred to the definition of the surface numbers in Table 3 and will not be provided again.

Second Embodiment

Referring to FIGS. 2A and 2B, an optical lens assembly in accordance with a second embodiment of the present invention includes, in order from a visual side to an image source side along an optical axis 295: a stop 200, a first element group E1 and a second element group E2. The stop 200 may be located in a position where the user's eyes view the virtual image. When the focus of the optical lens assembly changes from a near point to a far point, the first element group E1 moves from the image source side to the visual side relative to the second element group E2. The optical lens assembly has a total of four lenses with refractive power, but is not limited thereto.

The first element group E1 includes a first lens group G1, a first optical layer 260 and a partial-reflective-partial-transmissive element 270.

The first lens group G1 with positive refractive power includes, in order from the visual side to the image source side along the optical axis 295: a first lens 210, a second lens 220 and a third lens 230.

The first lens 210 includes a visual-side surface 211 and an image source-side surface 212, the visual-side surface 211 of the first lens 210 is flat in a paraxial region thereof, the image source-side surface 212 of the first lens 210 is convex in a paraxial region thereof, the image source-side surface 212 of the first lens 210 is aspheric, and the first lens 210 is made of plastic.

The second lens 220 includes a visual-side surface 221 and an image source-side surface 222, the visual-side surface 221 of the second lens 220 is concave in a paraxial region thereof, the image source-side surface 222 of the second lens 220 is convex in a paraxial region thereof, the visual-side surface 221 and the image source-side surface 222 of the second lens 220 are aspheric, and the second lens 220 is made of plastic.

The third lens 230 includes a visual-side surface 231 and an image source-side surface 232, the visual-side surface 231 of the third lens 230 is convex in a paraxial region thereof, the image source-side surface 232 of the third lens 230 is convex in a paraxial region thereof, the visual-side surface 231 and the image source-side surface 232 of the third lens 230 are aspheric, and the third lens 230 is made of plastic.

The first optical layer 260 is located on the visual-side surface 211 of the first lens 210, and the configuration of the first optical layer 260 is the same as that of the first optical layer 160 of the first embodiment and will not be explained again.

The partial-reflective-partial-transmissive element 270 is located on the image source-side surface 212 of the first lens 210, and the configuration of the partial-reflective-partial-transmissive element 270 is the same as that of the partial-reflective-partial-transmissive element 170 of the first embodiment and will not be explained again.

The second element group E2 includes a second lens group G2, a second optical layer 280 and an image source plane 291. The optical lens assembly works in cooperation with an image source 293 disposed on the image source plane 291. The type of the image source 293 may be a liquid crystal display, an OLED display, or a LED display, but is not limited thereto.

The second lens group G2 with positive refractive power is located between the third lens 230 and the second optical layer 280, and includes only a fourth lens 240. The fourth lens 240 includes a visual-side surface 241 and an image source-side surface 242, the visual-side surface 241 of the fourth lens 240 is convex in a paraxial region thereof, the image source-side surface 242 of the fourth lens 240 is convex in a paraxial region thereof, the visual-side surface 241 and the image source-side surface 242 of the fourth lens 240 are spherical, and the fourth lens 240 is made of glass.

The second optical layer 280 is located on the image source plane 291, and the configuration of the second optical layer 280 is the same as that of the second optical layer 180 of the first embodiment and will not be explained again.

The detailed data of the second embodiment is shown in Tables 5-8.

TABLE 5

| Near point: f_N(focal length) = 14.13 mm, EPD(entrance pupil diameter) = 10.00 mm, FOV_N(field of view) = 88.5° |
| Far point: f_F(focal length) = 18.07 mm, EPD (entrance pupil diameter) = 10.00 mm, FOV_F(field of view) = 69.8° |

| Surface | | Curvature Radius | Thickness/gap | Refractive Index (nd) | Abbe number (vd) | Refraction/ reflection |
|---|---|---|---|---|---|---|
| 0 | Stop | infinity | 14.000(Near point) 5.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 3.106 | 1.544 | 55.9 | refraction |
| 5 | Partial-reflective-partial-transmissive element | −50.481 | −3.106 | | mirror | reflection |
| 6 | First phase retarder | infinity | −0.100 | 1.533 | 56.0 | refraction |
| 7 | Reflective polarizer | infinity | −0.100 | 1.533 | 56.0 | refraction |
| 8 | Reflective polarizer | infinity | 0.100 | | mirror | reflection |
| 9 | First phase retarder | infinity | 0.100 | 1.533 | 56.0 | refraction |
| 10 | First lens | infinity | 3.106 | 1.544 | 55.9 | refraction |
| 11 | Partial-reflective-partial-transmissive element | −50.481 | 0.825 | — | — | refraction |
| 12 | Second lens | −18.042 | 3.734 | 1.657 | 20.9 | refraction |
| 13 | | −50.124 | 0.300 | — | — | refraction |
| 14 | Third lens | 31.636 | 5.945 | 1.544 | 55.9 | refraction |
| 15 | | −55.737 | 0.300(Near point) 9.337(Far point) | — | — | refraction |
| 16 | Fourth lens | 60.132 | 4.167 | 1.729 | 54.7 | refraction |
| 17 | | −50.286 | 0.870 | — | — | refraction |
| 18 | Second phase retarder | infinity | 0.100 | 1.533 | 56.0 | refraction |
| 19 | Second absorptive polarizer | infinity | 0.100 | 1.533 | 56.0 | refraction |
| 20 | Image source plane | infinity | — | — | — | — |

Note:
the reference wavelength is 530 nm

TABLE 6

| Surface | 4, 10 | 5, 11 | 12 | 13 |
|---|---|---|---|---|
| K: | 0.0000E+00 | −2.0221E+00 | −1.1601E−01 | −1.8031E+01 |
| A2: | 0.0000E+00 | 0.0000E+00 | 0.0000E+00 | 0.0000E+00 |
| A4: | 0.0000E+00 | 2.1986E−06 | 2.6332E−04 | 1.0638E−04 |
| A6: | 0.0000E+00 | −3.2405E−08 | −1.6835E−06 | 2.8674E−06 |
| A8: | 0.0000E+00 | 8.7091E−10 | 7.4780E−09 | −7.2493E−08 |
| A10: | 0.0000E+00 | −1.2586E−11 | −4.6381E−11 | 7.1113E−10 |
| A12: | 0.0000E+00 | 8.5439E−14 | 3.6586E−13 | −3.5403E−12 |
| A14: | 0.0000E+00 | −2.7180E−16 | −1.4856E−15 | 8.7872E−15 |
| A16: | 0.0000E+00 | 3.2844E−19 | 2.1663E−18 | −8.6580E−18 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 14 | 15 | 16 | 17 |
|---|---|---|---|---|
| K: | 0.0000E+00 | −4.9331E+00 | 0.0000E+00 | 0.0000E+00 |
| A2: | 0.0000E+00 | 0.0000E+00 | 0.0000E+00 | 0.0000E+00 |
| A4: | −3.4179E−04 | −3.4084E−04 | 0.0000E+00 | 0.0000E+00 |
| A6: | 7.6826E−06 | 6.0050E−06 | 0.0000E+00 | 0.0000E+00 |
| A8: | −9.1829E−08 | −3.2535E−08 | 0.0000E+00 | 0.0000E+00 |
| A10: | 7.5092E−10 | 5.4783E−11 | 0.0000E+00 | 0.0000E+00 |
| A12: | −3.8782E−12 | 6.9273E−13 | 0.0000E+00 | 0.0000E+00 |
| A14: | 1.1592E−14 | −5.3610E−15 | 0.0000E+00 | 0.0000E+00 |
| A16: | −1.5533E−17 | 1.0769E−17 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 7

| | | | |
|---|---|---|---|
| f_N [mm] | 14.13 | FOV_mn [°] | 69.8 | LBS [mm] | 3.41 |
| f_F [mm] | 18.07 | GCT1 [mm] | 14.21 | G1R1 [mm] | infinity |
| f_G1 [mm] | 60.92 | GCT2 [mm] | 4.17 | G1R2 [mm] | −55.74 |
| f_G2 [mm] | 37.93 | MS1_N [mm] | 19.75 | G2R1 [mm] | 60.13 |
| GT12_N [mm] | 0.30 | MS1_F [mm] | 28.78 | G2R2 [mm] | −50.29 |
| GT12_F [mm] | 9.34 | MS2_N [mm] | 5.54 | R_BS [mm] | −50.48 |
| FOV_mx [°] | 88.5 | MS2_F [mm] | 14.57 | IMH [mm] | 11.20 |

TABLE 8

| | | | |
|---|---|---|---|
| f_G1/f_G2 | 1.61 | GCT2/GCT1 | 0.29 |
| f_N/f_G1 | 0.23 | R_BS/(2*MS1_N) | −1.28 |
| f_N/f_F | 0.78 | MS2_F/f_G2 | 0.38 |
| f_N*MS1_F/(f_F*IMH) | 2.01 | GCT2/G2R2 | −0.08 |
| (f_F-f_N)/(GT12_F-GT12_N) | 0.44 | f_G1/G1R2 | −1.09 |
| GCT1/LBS | 4.17 | f_G2/G2R1 | 0.63 |
| MS2_F/f_G1 | 0.24 | FOV_mx/FOV_mn | 1.27 |
| MS2_F/GCT2 | 3.50 | MS1_F/MS1_N | 1.46 |
| MS1_N/f_N | 1.40 | — | — |

In the second embodiment, the curve equation of the aspheric surface profiles of the aforementioned lenses is the same as the curve equation of the aspheric surface profiles of the aforementioned lenses in the first embodiment. The values of the parameters in Table 7 can be calculated from Tables 5 and 6, and meets the conditions in Table 8. The definition of the surfaces in Table 5 can be referred to the relevant description of Table 3 and will not be explained again.

Third Embodiment

Referring to FIGS. 3A and 3B, an optical lens assembly in accordance with a third embodiment of the present invention includes, in order from a visual side to an image source side along an optical axis 395: a stop 300, a first element group E1 and a second element group E2. The stop 300 may be located in a position where the user's eyes view the virtual image. When the focus of the optical lens assembly changes from a near point to a far point, the first element group E1 moves from the image source side to the visual side relative to the second element group E2. The optical lens assembly has a total of four lenses with refractive power, but is not limited thereto.

The first element group E1 includes a first lens group G1, a first optical layer 360 and a partial-reflective-partial-transmissive element 370.

The first lens group G1 with positive refractive power includes, in order from the visual side to the image source side along the optical axis 395: a first lens 310 and a second lens 320.

The first lens 310 includes a visual-side surface 311 and an image source-side surface 312, the visual-side surface 311 of the first lens 310 is flat in a paraxial region thereof, the image source-side surface 312 of the first lens 310 is convex in a paraxial region thereof, the image source-side surface 312 of the first lens 310 is aspheric, and the first lens 310 is made of plastic.

The second lens 320 includes a visual-side surface 321 and an image source-side surface 322, the visual-side surface 321 of the second lens 320 is concave in a paraxial region thereof, the image source-side surface 322 of the second lens 320 is convex in a paraxial region thereof, the visual-side surface 321 and the image source-side surface 322 of the second lens 320 are aspheric, and the second lens 320 is made of plastic.

The first optical layer 360 is located on the visual-side surface 311 of the first lens 310, and the configuration of the first optical layer 360 is the same as that of the first optical layer 160 of the first embodiment and will not be explained again.

The partial-reflective-partial-transmissive element 370 is located on the image source-side surface 322 of the second lens 320, and the configuration of the partial-reflective-partial-transmissive element 370 is the same as that of the partial-reflective-partial-transmissive element 170 of the first embodiment and will not be explained again.

The second element group E2 includes, in order from the visual side to the image source side along the optical axis 395: a second lens group G2, a second optical layer 380 and an image source plane 391. The optical lens assembly works in cooperation with an image source 393 disposed on the image source plane 391. The type of the image source 393 may be a liquid crystal display, an OLED display, or a LED display, but is not limited thereto.

The second lens group G2 with positive refractive power includes, in order from the visual side to the image source side along the optical axis 395: a third lens 330 and a fourth lens 340.

The third lens 330 includes a visual-side surface 331 and an image source-side surface 332, the visual-side surface 331 of the third lens 330 is concave in a paraxial region thereof, the image source-side surface 332 of the third lens 330 is convex in a paraxial region thereof, the visual-side surface 331 and the image source-side surface 332 of the third lens 330 are aspheric, and the third lens 330 is made of plastic.

The fourth lens 340 includes a visual-side surface 341 and an image source-side surface 342, the visual-side surface 341 of the fourth lens 340 is convex in a paraxial region thereof, the image source-side surface 342 of the fourth lens 340 is flat in a paraxial region thereof, the visual-side surface 341 of the fourth lens 340 is spherical, and the fourth lens 340 is made of glass.

The second optical layer 380 is located on the image source-side surface 342 of the fourth lens 340, and the configuration of the second optical layer 380 is the same as that of the second optical layer 180 of the first embodiment and will not be explained again.

The detailed data of the third embodiment is shown in Tables 9-12.

TABLE 9

Near point: f_N(focal length) = 16.64 mm, EPD(entrance pupil diameter) = 10.00 mm, FOV_N(field of view) = 89.0°
Far point: f_F(focal length) = 16.74 mm, EPD (entrance pupil diameter) = 10.00 mm, FOV_F(field of view) = 89.3°

| Surface | | Curvature Radius | Thickness/gap | Refractive Index (nd) | Abbe number (vd) | Refraction/ reflection |
|---|---|---|---|---|---|---|
| 0 | Stop | infinity | 13.400(Near point) 13.100(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 5.407 | 1.546 | 56.0 | refraction |
| 5 | | −38.139 | 0.300 | — | — | refraction |
| 6 | Second lens | −44.889 | 2.000 | 1.657 | 20.9 | refraction |
| 7 | Partial-reflective-partial-transmissive element | −66.061 | −2.000 | | mirror | reflection |
| 8 | | −44.889 | −0.300 | — | — | refraction |
| 9 | First lens | −38.139 | −5.407 | 1.546 | 56.0 | refraction |
| 10 | First phase retarder | infinity | −0.100 | 1.533 | 56.0 | refraction |
| 11 | Reflective polarizer | infinity | −0.100 | 1.533 | 56.0 | refraction |
| 12 | Reflective polarizer | infinity | 0.100 | | mirror | reflection |
| 13 | First phase retarder | infinity | 0.100 | 1.533 | 56.0 | refraction |
| 14 | First lens | infinity | 5.407 | 1.546 | 56.0 | refraction |
| 15 | | −38.139 | 0.300 | — | — | refraction |
| 16 | Second lens | −44.889 | 2.000 | 1.657 | 20.9 | refraction |
| 17 | Partial-reflective-partial-transmissive element | −66.061 | 0.300(Near point) 0.625(Far point) | — | — | refraction |
| 18 | Third lens | −4456.759 | 5.231 | 1.546 | 56.0 | refraction |
| 19 | | −51.825 | 0.300 | — | — | refraction |
| 20 | Fourth lens | 51.703 | 2.932 | 1.517 | 64.2 | refraction |
| 21 | Second phase retarder | infinity | 0.100 | 1.533 | 56.0 | refraction |
| 22 | Second absorptive polarizer | infinity | 0.100 | 1.533 | 56.0 | refraction |
| 23 | | infinity | 1.070 | — | — | refraction |
| 24 | Image source plane | infinity | — | — | — | — |

Note:
the reference wavelength is 530 nm

TABLE 10

| Surface | 4, 10, 14 | 5, 9, 15 | 6, 8, 16 | 7, 17 |
|---|---|---|---|---|
| K: | 0.0000E+00 | −4.5228E+00 | 1.3490E+00 | 9.1722E−02 |
| A2: | 0.0000E+00 | 0.0000E+00 | 0.0000E+00 | 0.0000E+00 |
| A4 | 0.0000E+00 | −3.9534E−05 | −3.8036E−05 | −3.6570E−06 |
| A6: | 0.0000E+00 | 4.2671E−07 | 4.8870E−07 | 3.5986E−08 |
| A8: | 0.0000E+00 | −2.5167E−09 | −3.8528E−09 | −4.4011E−10 |
| A10: | 0.0000E+00 | 1.0905E−11 | 2.0948E−11 | 2.9976E−12 |
| A12: | 0.0000E+00 | −3.6045E−14 | −7.4389E−14 | −1.1384E−14 |
| A14: | 0.0000E+00 | 7.0888E−17 | 1.5003E−16 | 2.3707E−17 |
| A16: | 0.0000E+00 | −5.6873E−20 | −1.2573E−19 | −2.0495E−20 |

TABLE 10-continued

| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 18 | 19 | 20 | 21 |
| --- | --- | --- | --- | --- |
| K: | 0.0000E+00 | 8.6165E+00 | 0.0000E+00 | 0.0000E+00 |
| A2: | 0.0000E+00 | 0.0000E+00 | 0.0000E+00 | 0.0000E+00 |
| A4: | 4.5100E−05 | 9.0766E−05 | 0.0000E+00 | 0.0000E+00 |
| A6: | −1.1984E−07 | −3.2396E−07 | 0.0000E+00 | 0.0000E+00 |
| A8: | −2.9309E−09 | −1.1220E−08 | 0.0000E+00 | 0.0000E+00 |
| A10: | 4.7498E−11 | 1.7185E−10 | 0.0000E+00 | 0.0000E+00 |
| A12: | −2.7742E−13 | −1.0278E−12 | 0.0000E+00 | 0.0000E+00 |
| A14: | 7.3775E−16 | 2.8933E−15 | 0.0000E+00 | 0.0000E+00 |
| A16: | −7.2480E−19 | −3.1194E−18 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 11

| $f\_N$ [mm] | 16.64 | FOV_mn [°] | 89.0 | LBS [mm] | 8.01 |
| --- | --- | --- | --- | --- | --- |
| $f\_F$ [mm] | 16.74 | GCT1 [mm] | 8.01 | G1R1 [mm] | infinity |
| $f\_G1$ [mm] | 103.47 | GCT2 [mm] | 8.46 | G1R2 [mm] | −66.06 |
| $f\_G2$ [mm] | 48.76 | MS1_N [mm] | 18.04 | G2R1 [mm] | −4456.76 |
| GT12_N [mm] | 0.30 | MS1_F [mm] | 18.36 | G2R2 [mm] | infinity |
| GT12_F [mm] | 0.63 | MS2_N [mm] | 10.03 | R_BS [mm] | −66.06 |
| FOV_mx [°] | 89.3 | MS2_F [mm] | 10.36 | IMH [mm] | 12.60 |

TABLE 12

| $f\_G1/f\_G2$ | 2.12 | GCT2/GCT1 | 1.06 |
| --- | --- | --- | --- |
| $f\_N/f\_G1$ | 0.16 | R_BS/(2*MS1_N) | −1.83 |
| $f\_N/f\_F$ | 0.99 | MS2_F/f_G2 | 0.21 |
| $f\_N*MS1\_F/(f\_F*IMH)$ | 1.45 | GCT2/G2R2 | 0.00 |
| (f_F-f_N)/(GT12_F-GT12_N) | 0.31 | f_G1/G1R2 | −1.57 |
| GCT1/LBS | 1.00 | f_G2/G2R1 | −0.01 |
| MS2_F/f_G1 | 0.10 | FOV_mx/FOV_mn | 1.00 |
| MS2_F/GCT2 | 1.22 | MS1_F/MS1_N | 1.02 |
| MS1_N/f_N | 1.08 | — | — |

In the third embodiment, the curve equation of the aspheric surface profiles of the aforementioned lenses is the same as the curve equation of the aspheric surface profiles of the aforementioned lenses in the first embodiment. The values of the parameters in Table 11 can be calculated from Tables 9 and 10, and meets the conditions in Table 12.

Fourth Embodiment

Referring to FIGS. 4A and 4B, an optical lens assembly in accordance with a fourth embodiment of the present invention includes, in order from a visual side to an image source side along an optical axis 495: a stop 400, a first element group E1 and a second element group E2. The stop 400 may be located in a position where the user's eyes view the virtual image. When the focus of the optical lens assembly changes from a near point to a far point, the first element group E1 moves from the image source side to the visual side relative to the second element group E2. The optical lens assembly has a total of four lenses with refractive power, but is not limited thereto.

The first element group E1 includes a first lens group G1, a first optical layer 460 and a partial-reflective-partial-transmissive element 470.

The first lens group G1 with positive refractive power includes, in order from the visual side to the image source side along the optical axis 495: a first lens 410 and a second lens 420.

The first lens 410 includes a visual-side surface 411 and an image source-side surface 412, the visual-side surface 411 of the first lens 410 is flat in a paraxial region thereof, the image source-side surface 412 of the first lens 410 is concave in a paraxial region thereof, the image source-side surface 412 of the first lens 410 is aspheric, and the first lens 410 is made of plastic.

The second lens 420 includes a visual-side surface 421 and an image source-side surface 422, the visual-side surface 421 of the second lens 420 is convex in a paraxial region thereof, the image source-side surface 422 of the second lens 420 is convex in a paraxial region thereof, the visual-side surface 421 and the image source-side surface 422 of the second lens 420 are aspheric, and the second lens 420 is made of plastic.

The first optical layer 460 is located on the visual-side surface 411 of the first lens 410, and the configuration of the first optical layer 460 is the same as that of the first optical layer 160 of the first embodiment and will not be explained again.

The partial-reflective-partial-transmissive element 470 is located on the image source-side surface 422 of the second lens 420, and the configuration of the partial-reflective-partial-transmissive element 470 is the same as that of the partial-reflective-partial-transmissive element 170 of the first embodiment and will not be explained again.

The second element group E2 includes, in order from the visual side to the image source side along the optical axis 495: a second lens group G2, a second optical layer 480 and an image source plane 491. The optical lens assembly works in cooperation with an image source 493 located on the image source plane 491. The type of the image source 493 may be a liquid crystal display, an OLED display, or a LED display, but is not limited thereto.

The second lens group G2 with positive refractive power includes, in order from the visual side to the image source side along the optical axis 495: a third lens 430 and a fourth lens 440.

The third lens 430 includes a visual-side surface 431 and an image source-side surface 432, the visual-side surface 431 of the third lens 430 is concave in a paraxial region thereof, the image source-side surface 432 of the third lens 430 is convex in a paraxial region thereof, the visual-side surface 431 and the image source-side surface 432 of the third lens 430 are aspheric, and the third lens 430 is made of plastic.

The fourth lens 440 includes a visual-side surface 441 and an image source-side surface 442, the visual-side surface 441 of the fourth lens 440 is concave in a paraxial region thereof, the image source-side surface 442 of the fourth lens 440 is flat in a paraxial region thereof, the visual-side surface 441 of the fourth lens 440 is spherical, and the fourth lens 440 is made of glass.

The second optical layer 480 is located on the image source-side surface 442 of the fourth lens 440, and the configuration of the second optical layer 480 is the same as that of the second optical layer 180 of the first embodiment and will not be explained again.

The detailed data of the fourth embodiment is shown in Tables 13-16.

TABLE 13

Near point: f_N(focal length) = 17.16 mm, EPD(entrance pupil diameter) = 10.00 mm, FOV_N(field 0 of view) = 88.4
Far point: f_F(focal length) = 17.90 mm, EPD (entrance pupil diameter) = 10.00 mm, FOV_F(field of view) = 90.8

| Surface | | Curvature Radius | Thickness/gap | Refractive Index (nd) | Abbe number (vd) | Refraction/ reflection |
|---|---|---|---|---|---|---|
| 0 | Stop | infinity | 13.400(Near point) 10.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 1.780 | 1.657 | 20.9 | refraction |
| 5 | | 129.235 | 0.300 | — | — | refraction |
| 6 | Second lens | 63.545 | 5.735 | 1.545 | 56.9 | refraction |
| 7 | Partial-reflective-partial-transmissive element | −71.517 | −5.735 | mirror | | reflection |
| 8 | | 63.545 | −0.300 | — | — | refraction |
| 9 | First lens | 129.235 | −1.780 | 1.657 | 20.9 | refraction |
| 10 | First phase retarder | infinity | −0.100 | 1.533 | 56.0 | refraction |
| 11 | Reflective polarizer | infinity | −0.100 | 1.533 | 56.0 | refraction |
| 12 | Reflective polarizer | infinity | 0.100 | mirror | | reflection |
| 13 | First phase retarder | infinity | 0.100 | 1.533 | 56.0 | refraction |
| 14 | First lens | infinity | 1.780 | 1.657 | 20.9 | refraction |
| 15 | | 129.235 | 0.300 | — | — | refraction |
| 16 | Second lens | 63.545 | 5.735 | 1.545 | 56.9 | refraction |
| 17 | Partial-reflective-partial-transmissive element | −71.517 | 0.300(Near point) 3.723(Far point) | | | refraction |
| 18 | Third lens | −617.605 | 5.800 | 1.546 | 56.0 | refraction |
| 19 | | −26.839 | 0.300 | — | — | refraction |
| 20 | Fourth lens | −126.225 | 2.000 | 1.847 | 23.8 | refraction |
| 21 | Second phase retarder | infinity | 0.100 | 1.533 | 56.0 | refraction |
| 22 | Second absorptive polarizer | infinity | 0.100 | 1.533 | 56.0 | refraction |
| 23 | | infinity | 1.370 | — | — | refraction |
| 24 | Image source plane | infinity | — | — | — | — |

Note:
the reference wavelength is 530 nm

50

TABLE 14

| Surface | 4, 10, 14 | 5, 9, 15 | 6, 8, 16 | 7, 17 |
|---|---|---|---|---|
| K: | 0.0000E+00 | 0.0000E+00 | 0.0000E+00 | −1.2810E+00 |
| A2 | 0.0000E+00 | 0.0000E+00 | 0.0000E+00 | 0.0000E+00 |
| A4: | 0.0000E+00 | 2.4946E−05 | 1.5365E−05 | −2.0144E−06 |
| A6: | 0.0000E+00 | −2.9625E−07 | −3.0592E−08 | 6.6542E−08 |
| A8: | 0.0000E+00 | 1.3432E−09 | −1.9767E−09 | −6.0576E−10 |
| A10: | 0.0000E+00 | −2.3096E−12 | 1.3324E−11 | 1.6692E−12 |
| A12: | 0.0000E+00 | 7.8335E−16 | −3.1052E−14 | −3.0655E−16 |
| A14: | 0.0000E+00 | 0.0000E+00 | 2.3333E−17 | −3.0001E−18 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 14-continued

| Surface | 18 | 19 | 20 | 21 |
|---|---|---|---|---|
| K: | 0.0000E+00 | 9.0313E−01 | 0.0000E+00 | 0.0000E+00 |
| A2: | 0.0000E+00 | 0.0000E+00 | 0.0000E+00 | 0.0000E+00 |
| A4: | 4.6597E−05 | 1.3061E−04 | 0.0000E+00 | 0.0000E+00 |
| A6: | −8.3290E−07 | −1.0311E−06 | 0.0000E+00 | 0.0000E+00 |
| A8: | 1.0678E−08 | 6.3949E−09 | 0.0000E+00 | 0.0000E+00 |
| A10: | −6.1678E−11 | −1.0241E−11 | 0.0000E+00 | 0.0000E+00 |
| A12: | 1.6686E−13 | −1.2905E−13 | 0.0000E+00 | 0.0000E+00 |
| A14: | −1.6512E−16 | 7.6488E−16 | 0.0000E+00 | 0.0000E+00 |
| A16: | 0.0000E+00 | −1.2125E−18 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 15

| | | | |
|---|---|---|---|
| f_N [mm] | 17.16 | FOV_mn [°] | 88.4 | LBS [mm] | 8.12 |
| f_F [mm] | 17.90 | GCT1 [mm] | 8.12 | G1R1 [mm] | infinity |
| f_G1 [mm] | 90.66 | GCT2 [mm] | 8.10 | G1R2 [mm] | −71.52 |
| f_G2 [mm] | 51.16 | MS1_N [mm] | 18.09 | G2R1 [mm] | −617.61 |
| GT12_N [mm] | 0.30 | MS1_F [mm] | 21.51 | G2R2 [mm] | infinity |
| GT12_F [mm] | 3.72 | MS2_N [mm] | 9.97 | R_BS [mm] | −71.52 |
| FOV_mx [°] | 90.8 | MS2_F [mm] | 13.39 | IMH [mm] | 12.50 |

TABLE 16

| | | | |
|---|---|---|---|
| f_G1/f_G2 | 1.77 | GCT2/GCT1 | 1.00 |
| f_N/f_G1 | 0.19 | R_BS/(2*MS1_N) | −1.98 |
| f_N/f_F | 0.96 | MS2_F/f_G2 | 0.26 |
| f_N*MS1_F/(f_F*IMH) | 1.65 | GCT2/G2R2 | 0.00 |
| (f_F-f_N)/(GT12_F-GT12_N) | 0.22 | f_G1/G1R2 | −1.27 |
| GCT1/LBS | 1.00 | f_G2/G2R1 | −0.08 |
| MS2_F/f_G1 | 0.15 | FOV_mx/FOV_mn | 1.03 |
| MS2_F/GCT2 | 1.65 | MS1_F/MS1_N | 1.19 |
| MS1_N/f_N | 1.05 | — | — |

In the fourth embodiment, the curve equation of the aspheric surface profiles of the aforementioned lenses is the same as the curve equation of the aspheric surface profiles of the aforementioned lenses in the first embodiment. The values of the parameters in Table 15 can be calculated from Tables 13 and 14, and meets the conditions in Table 16.

Fifth Embodiment

Referring to FIGS. 5A and 5B, an optical lens assembly in accordance with a fifth embodiment of the present invention includes, in order from a visual side to an image source side along an optical axis 595: a stop 500, a first element group E1 and a second element group E2. The stop 500 may be located in a position where the user's eyes view the virtual image. When the focus of the optical lens assembly changes from a near point to a far point, the first element group E1 moves from the image source side to the visual side relative to the second element group E2. The optical lens assembly has a total of five lenses with refractive power, but is not limited thereto.

The first element group E1 includes a first lens group G1, a first optical layer 560 and a partial-reflective-partial-transmissive element 570.

The first lens group G1 with positive refractive power includes, in order from the visual side to the image source side along the optical axis 595: a first lens 510, a second lens 520 and a third lens 530.

The first lens 510 includes a visual-side surface 511 and an image source-side surface 512, the visual-side surface 511 of the first lens 510 is flat in a paraxial region thereof, the image source-side surface 512 of the first lens 510 is convex in a paraxial region thereof, the image source-side surface 512 of the first lens 510 is spherical, and the first lens 510 is made of plastic.

The second lens 520 includes a visual-side surface 521 and an image source-side surface 522, the visual-side surface 521 of the second lens 520 is concave in a paraxial region thereof, the image source-side surface 522 of the second lens 520 is concave in a paraxial region thereof, the visual-side surface 521 and the image source-side surface 522 of the second lens 520 are spherical, and the second lens 520 is made of glass.

The third lens 530 includes a visual-side surface 531 and an image source-side surface 532, the visual-side surface 531 of the third lens 530 is convex in a paraxial region thereof, the image source-side surface 532 of the third lens 530 is convex in a paraxial region thereof, the visual-side surface 531 and the image source-side surface 532 of the third lens 530 are aspheric, and the third lens 530 is made of plastic.

The first optical layer 560 is located on the visual-side surface 511 of the first lens 510, and the configuration of the first optical layer 560 is the same as that of the first optical layer 160 of the first embodiment and will not be explained again.

The partial-reflective-partial-transmissive element 570 is located on the image source-side surface 512 of the first lens 510, and the configuration of the partial-reflective-partial-transmissive element 570 is the same as that of the partial-reflective-partial-transmissive element 170 of the first embodiment and will not be explained again.

The second element group E2 includes, in order from the visual side to the image source side along the optical axis 595: a second lens group G2, a second optical layer 580 and an image source plane 591. The optical lens assembly works in cooperation with an image source 593 located on the image source plane 591. The type of the image source 593 may be a liquid crystal display, an OLED display, or a LED display, but is not limited thereto.

The second lens group G2 with positive refractive power includes, in order from the visual side to the image source side along the optical axis 595: a fourth lens 540 and a fifth lens 550.

The fourth lens 540 includes a visual-side surface 541 and an image source-side surface 542, the visual-side surface 541 of the fourth lens 540 is concave in a paraxial region thereof, the image source-side surface 542 of the fourth lens 540 is convex in a paraxial region thereof, the visual-side surface 541 and the image source-side surface 542 of the fourth lens 540 are aspheric, and the fourth lens 540 is made of plastic.

The fifth lens 550 includes a visual-side surface 551 and an image source-side surface 552, the visual-side surface 551 of the fifth lens 550 is convex in a paraxial region thereof, the image source-side surface 552 of the fifth lens 550 is flat in a paraxial region thereof, the visual-side surface 551 of the fifth lens 550 is spherical, and the fifth lens 550 is made of glass.

The second optical layer 580 is located on the image source-side surface 552 of the fifth lens 550, and the configuration of the second optical layer 580 is the same as that of the second optical layer 180 of the first embodiment and will not be explained again.

The detailed data of the fifth embodiment is shown in Tables 17-20.

TABLE 17

Near point: f_N(focal length) = 14.79 mm, EPD(entrance pupil diameter) = 10.00 mm, FOV_N(field of view) = 88.5
Far point: f_F(focal length) = 15.38 mm, EPD (entrance pupil diameter) = 10.00 mm, FOV_F(field of view) = 90.0

| Surface | | Curvature Radius | Thickness/gap | Refractive Index (nd) | Abbe number (vd) | Refraction/ reflection |
|---|---|---|---|---|---|---|
| 0 | Stop | infinity | 13.032(Near point) 11.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 3.161 | 1.544 | 55.9 | refraction |
| 5 | Partial-reflective-partial-transmissive element | −53.585 | −3.161 | mirror | | reflection |
| 6 | First phase retarder | infinity | −0.100 | 1.533 | 56.0 | refraction |
| 7 | Reflective polarizer | infinity | −0.100 | 1.533 | 56.0 | refraction |
| 8 | Reflective polarizer | infinity | 0.100 | mirror | | reflection |
| 9 | First phase retarder | infinity | 0.100 | 1.533 | 56.0 | refraction |
| 10 | First lens | infinity | 3.161 | 1.544 | 55.9 | refraction |
| 11 | Partial-reflective-partial-transmissive element | −53.585 | 0.500 | — | — | refraction |
| 12 | Second lens | −52.837 | 2.000 | 1.847 | 23.8 | refraction |
| 13 | | 157.778 | 0.500 | — | — | refraction |
| 14 | Third lens | 30.492 | 6.114 | 1.544 | 55.9 | refraction |
| 15 | | −50.366 | 0.100(Near point) 2.132(Far point) | — | — | refraction |
| 16 | Fourth lens | −58.830 | 3.000 | 1.544 | 55.9 | refraction |
| 17 | | −49.386 | 0.100 | — | — | refraction |
| 18 | Fifth lens | 41.292 | 2.902 | 1.744 | 44.9 | refraction |
| 19 | Second phase retarder | infinity | 0.100 | 1.533 | 56.0 | refraction |
| 20 | Second absorptive polarizer | infinity | 0.100 | 1.533 | 56.0 | refraction |
| 21 | | infinity | 1.300 | — | — | refraction |
| 22 | Image source plane | infinity | — | — | — | — |

Note:
the reference wavelength is 530 nm

TABLE 18

| Surface | 4, 10 | 5, 11 | 12 | 13 | 14 |
|---|---|---|---|---|---|
| K: | 0.0000E+00 | 0.0000E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 |
| A4: | 0.0000E+00 | 0.0000E+00 | 0.0000E+00 | 0.0000E+00 | −2.3007E−05 |
| A6: | 0.0000E+00 | 0.0000E+00 | 0.0000E+00 | 0.0000E+00 | 2.5341E−07 |
| A8 | 0.0000E+00 | 0.0000E+00 | 0.0000E+00 | 0.0000E+00 | −1.6940E−09 |
| A10: | 0.0000E+00 | 0.0000E+00 | 0.0000E+00 | 0.0000E+00 | 2.6266E−12 |
| A12: | 0.0000E+00 | 0.0000E+00 | 0.0000E+00 | 0.0000E+00 | 4.8071E−15 |
| A14: | 0.0000E+00 | 0.0000E+00 | 0.0000E+00 | 0.0000E+00 | −1.5117E−17 |
| A16: | 0.0000E+00 | 0.0000E+00 | 0.0000E+00 | 0.0000E+00 | −1.5504E−20 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

| Surface | 15 | 16 | 17 | 18 | 19 |
|---|---|---|---|---|---|
| K: | 0.0000E+00 | 0.0000E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 |
| A4: | 3.5816E−05 | 1.6738E−04 | 1.7452E−04 | 0.0000E+00 | 0.0000E+00 |
| A6 | −1.6136E−08 | −9.7857E−07 | −1.0179E−06 | 0.0000E+00 | 0.0000E+00 |
| A8: | −4.4959E−10 | 2.4353E−09 | −3.6089E−09 | 0.0000E+00 | 0.0000E+00 |
| A10: | 9.2510E−14 | 2.9659E−11 | 1.0264E−10 | 0.0000E+00 | 0.0000E+00 |
| A12: | 2.9551E−15 | −4.1994E−14 | −2.9200E−14 | 0.0000E+00 | 0.0000E+00 |
| A14: | −7.8631E−18 | −1.2002E−15 | −4.6795E−15 | 0.0000E+00 | 0.0000E+00 |

US 12,607,854 B2

29

30

TABLE 18-continued

| A16: | −8.1702E−21 | 4.5654E−18 | 1.7765E−17 | 0.0000E+00 | 0.0000E+00 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

TABLE 19

| f_N [mm] | 14.79 | FOV_mn [°] | 88.5 | LBS [mm] | 3.46 |
| f_F [mm] | 15.38 | GCT1 [mm] | 12.57 | G1R1 [mm] | infinity |
| f_G1 [mm] | 61.20 | GCT2 [mm] | 6.00 | G1R2 [mm] | −50.37 |
| f_G2 [mm] | 48.88 | MS1_N [mm] | 20.18 | G2R1 [mm] | −58.83 |
| GT12_N [mm] | 0.10 | MS1_F [mm] | 22.21 | G2R2 [mm] | infinity |
| GT12_F [mm] | 2.13 | MS2_N [mm] | 7.60 | R_BS [mm] | −53.59 |
| FOV_mx [°] | 90.0 | MS2_F [mm] | 9.63 | IMH [mm] | 11.19 |

TABLE 20

| f_G1/f_G2 | 1.25 | GCT2/GCT1 | 0.48 |
| f_N/f_G1 | 0.24 | R_BS/(2*MS1_N) | −1.33 |
| f_N/f_F | 0.96 | MS2_F/f_G2 | 0.20 |
| f_N*MS1_F/(f_F*IMH) | 1.91 | GCT2/G2R2 | 0.00 |
| (f_F-f_N)/(GT12_F-GT12_N) | 0.29 | f_G1/G1R2 | −1.22 |
| GCT1/LBS | 3.63 | f_G2/G2R1 | −0.83 |
| MS2_F/f_G1 | 0.16 | FOV_mx/FOV_mn | 1.02 |
| MS2_F/GCT2 | 1.61 | MS1_F/MS1_N | 1.10 |
| MS1_N/f_N | 1.36 | — | — |

In the fifth embodiment, the curve equation of the aspheric surface profiles of the aforementioned lenses is the same as the curve equation of the aspheric surface profiles of the aforementioned lenses in the first embodiment. The values of the parameters in Table 19 can be calculated from Tables 17 and 18, and meets the conditions in Table 20.

Sixth Embodiment

Referring to FIGS. 6A and 6B, an optical lens assembly in accordance with a sixth embodiment of the present invention includes, in order from a visual side to an image source side along an optical axis 695: a stop 600, a first element group E1 and a second element group E2. The stop 600 may be located in a position where the user's eyes view the virtual image. When the focus of the optical lens assembly changes from a near point to a far point, the second element group E2 moves from the visual side to the image source side relative to the first element group E1. The optical lens assembly has a total of four lenses with refractive power, but is not limited thereto.

The first element group E1 includes a first lens group G1, a first optical layer 660 and a partial-reflective-partial-transmissive element 670.

The first lens group G1 with positive refractive power includes only a first lens 610. The first lens 610 includes a visual-side surface 611 and an image source-side surface 612, the visual-side surface 611 of the first lens 610 is flat in a paraxial region thereof, the image source-side surface 612 of the first lens 610 is convex in a paraxial region thereof, the image source-side surface 612 of the first lens 610 is aspheric, and the first lens 610 is made of plastic.

The first optical layer 660 is located on the visual-side surface 611 of the first lens 610, and the configuration of the first optical layer 660 is the same as that of the first optical layer 160 of the first embodiment and will not be explained again.

The partial-reflective-partial-transmissive element 670 is located on the image source-side surface 612 of the first lens 610, and the configuration of the partial-reflective-partial-transmissive element 670 is the same as that of the partial-reflective-partial-transmissive element 170 of the first embodiment and will not be explained again.

The second element group E2 includes, in order from the visual side to the image source side along the optical axis 695: a second lens group G2, a second optical layer 680 and an image source plane 691. The optical lens assembly works in cooperation with an image source 693 located on the image source plane 691. The type of the image source 693 may be a liquid crystal display, an OLED display, or a LED display, but is not limited thereto.

The second lens group G2 with positive refractive power includes, in order from the visual side to the image source side along the optical axis 695: a second lens 620, a third lens 630 and a fourth lens 640.

The second lens 620 includes a visual-side surface 621 and an image source-side surface 622, the visual-side surface 621 of the second lens 620 is convex in a paraxial region thereof, the image source-side surface 622 of the second lens 620 is convex in a paraxial region thereof, the visual-side surface 621 and the image source-side surface 622 of the second lens 620 are aspheric, and the second lens 520 is made of plastic.

The third lens 630 includes a visual-side surface 631 and an image source-side surface 632, the visual-side surface 631 of the third lens 630 is convex in a paraxial region thereof, the image source-side surface 632 of the third lens 630 is convex in a paraxial region thereof, the visual-side surface 631 and the image source-side surface 632 of the third lens 630 are aspheric, and the third lens 630 is made of plastic.

The fourth lens 640 includes a visual-side surface 641 and an image source-side surface 642, the visual-side surface 641 of the fourth lens 640 is convex in a paraxial region thereof, the image source-side surface 642 of the fourth lens 640 is concave in a paraxial region thereof, the visual-side surface 641 and the image source-side surface 642 of the fourth lens 640 are spherical, and the fourth lens 640 is made of glass.

The second optical layer 680 is located on the image source plane 691, and the configuration of the second optical layer 680 is the same as that of the second optical layer 180 of the first embodiment and will not be explained again.

The detailed data of the sixth embodiment is shown in Tables 21-24.

TABLE 21

Near point: f_N(focal length) = 13.48 mm, EPD(entrance pupil diameter) = 10.00 mm, FOV_N(field of view) = 91.0
Far point: f_F(focal length) = 16.67 mm, EPD (entrance pupil diameter) = 10.00 mm, FOV_F(field of view) = 99.9

| Surface | | Curvature Radius | Thickness/gap | Refractive Index (nd) | Abbe number (vd) | Refraction/ reflection |
|---|---|---|---|---|---|---|
| 0 | Stop | infinity | 12.000(Near point) 12.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 5.720 | 1.544 | 55.9 | refraction |
| 5 | Partial-reflective-partial-transmissive element | −53.480 | −5.720 | mirror | | reflection |
| 6 | First phase retarder | infinity | −0.100 | 1.533 | 56.0 | refraction |
| 7 | Reflective polarizer | infinity | −0.100 | 1.533 | 56.0 | refraction |
| 8 | Reflective polarizer | infinity | 0.100 | mirror | | reflection |
| 9 | First phase retarder | infinity | 0.100 | 1.533 | 56.0 | refraction |
| 10 | First lens | infinity | 5.720 | 1.544 | 55.9 | refraction |
| 11 | Partial-reflective-partial-transmissive element | −53.480 | 0.100(Near point) 8.100(Far point) | — | — | refraction |
| 12 | Second lens | 132.238 | 2.010 | 1.544 | 55.9 | refraction |
| 13 | | −4970.192 | 0.300 | — | — | refraction |
| 14 | Third lens | 262.631 | 2.159 | 1.544 | 55.9 | refraction |
| 15 | | −158.369 | 0.400 | — | — | refraction |
| 16 | Fourth lens | 39.851 | 4.448 | 1.755 | 27.6 | refraction |
| 17 | | 1066.105 | 0.870 | — | — | refraction |
| 18 | Second phase retarder | infinity | 0.100 | 1.533 | 56.0 | refraction |
| 19 | Second absorptive polarizer | infinity | 0.100 | 1.533 | 56.0 | refraction |
| 20 | Image source plane | infinity | — | — | — | — |

Note:
the reference wavelength is 530 nm

TABLE 22

| Surface | 4, 10 | 5, 11 | 12 | 13 |
|---|---|---|---|---|
| K: | 0.0000E+00 | 0.0000E+00 | 0.0000E+00 | 0.0000E+00 |
| A2 | 0.0000E+00 | 0.0000E+00 | 0.0000E+00 | 0.0000E+00 |
| A4: | 0.0000E+00 | 2.7430E−06 | 6.8535E−06 | 1.4632E−05 |
| A6: | 0.0000E+00 | −1.4612E−09 | −1.1255E−08 | 2.1666E−08 |
| A8: | 0.0000E+00 | −1.7240E−12 | 2.6748E−12 | 4.4113E−11 |
| A10: | 0.0000E+00 | −4.0497E−15 | 3.4542E−13 | 3.3715E−14 |
| A12: | 0.0000E+00 | 2.4605E−17 | 1.4211E−15 | −2.0555E−16 |
| A14: | 0.0000E+00 | 1.0827E−19 | 2.9685E−18 | −1.2577E−18 |
| A16: | 0.0000E+00 | 0.0000E+00 | −2.1330E−21 | −3.8477E−21 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 14 | 15 | 16 | 17 |
|---|---|---|---|---|
| K: | 0.0000E+00 | 0.0000E+00 | 0.0000E+00 | 0.0000E+00 |
| A2 | 0.0000E+00 | 0.0000E+00 | 0.0000E+00 | 0.0000E+00 |
| A4 | 2.1998E−05 | 2.6766E−05 | 0.0000E+00 | 0.0000E+00 |
| A6: | 3.7187E−08 | −5.6683E−08 | 0.0000E+00 | 0.0000E+00 |
| A8: | −1.0127E−10 | −6.1017E−11 | 0.0000E+00 | 0.0000E+00 |
| A10: | −4.8386E−13 | 7.0421E−13 | 0.0000E+00 | 0.0000E+00 |
| A12: | −7.0828E−16 | 4.0888E−15 | 0.0000E+00 | 0.0000E+00 |
| A14: | 4.1944E−18 | 1.0619E−17 | 0.0000E+00 | 0.0000E+00 |
| A16: | 4.1168E−20 | −3.0313E−20 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 23

| f_N [mm] | 13.48 | FOV_mn [°] | 91.0 | LBS [mm] | 6.02 |
|---|---|---|---|---|---|
| f_F [mm] | 16.67 | GCT1 [mm] | 6.02 | G1R1 [mm] | infinity |
| f_G1 [mm] | 97.72 | GCT2 [mm] | 9.32 | G1R2 [mm] | −53.48 |
| f_G2 [mm] | 35.86 | MS1_N [mm] | 16.51 | G2R1 [mm] | 132.24 |
| GT12_N [mm] | 0.10 | MS1_F [mm] | 24.51 | G2R2 [mm] | 1066.10 |
| GT12_F [mm] | 8.10 | MS2_N [mm] | 10.49 | R_BS [mm] | −53.48 |
| FOV_mx [°] | 99.9 | MS2_F [mm] | 18.49 | IMH [mm] | 11.20 |

TABLE 24

| f_G1/f_G2 | 2.72 | GCT2/GCT1 | 1.55 |
|---|---|---|---|
| f_N/f_G1 | 0.14 | R_BS/(2*MS1_N) | −1.62 |
| f_N/f_F | 0.81 | MS2_F/f_G2 | 0.52 |
| f_N*MS1_F/(f_F*IMH) | 1.77 | GCT2/G2R2 | 0.01 |
| (f_F-f_N)/(GT12_F-GT12_N) | 0.40 | f_G1/G1R2 | −1.83 |
| GCT1/LBS | 1.00 | f_G2/G2R1 | 0.27 |
| MS2_F/f_G1 | 0.19 | FOV_mx/FOV_mn | 1.10 |
| MS2_F/GCT2 | 1.98 | MS1_F/MS1_N | 1.48 |
| MS1_N/f_N | 1.22 | — | — |

In the sixth embodiment, the curve equation of the aspheric surface profiles of the aforementioned lenses is the same as the curve equation of the aspheric surface profiles of the aforementioned lenses in the first embodiment. The values of the parameters in Table 23 can be calculated from Tables 21 and 22, and meets the conditions in Table 24.

Seventh Embodiment

Referring to FIGS. 7A and 7B, an optical lens assembly in accordance with a seventh embodiment of the present invention includes, in order from a visual side to an image source side along an optical axis 795: a stop 700, a first element group E1 and a second element group E2. The stop 700 may be located in a position where the user's eyes view the virtual image. When the focus of the optical lens assembly changes from a near point to a far point, the first element group E1 moves from the image source side to the visual side relative to the second element group E2. The optical lens assembly has a total of four lenses with refractive power, but is not limited thereto.

The first element group E1 includes a first lens group G1, a first optical layer 760, a partial-reflective-partial-transmissive element 770 and a second optical layer 780.

The first lens group G1 with positive refractive power includes, in order from the visual side to the image source side along the optical axis 795: a first lens 710, a second lens 720 and a third lens 730.

The first lens 710 includes a visual-side surface 711 and an image source-side surface 712, the visual-side surface 711 of the first lens 710 is flat in a paraxial region thereof, the image source-side surface 712 of the first lens 710 is convex in a paraxial region thereof, the image source-side surface 712 of the first lens 710 is aspheric, and the first lens 710 is made of plastic.

The second lens 720 includes a visual-side surface 721 and an image source-side surface 722, the visual-side surface 721 of the second lens 720 is concave in a paraxial region thereof, the image source-side surface 722 of the second lens 720 is convex in a paraxial region thereof, the visual-side surface 721 and the image source-side surface 722 of the second lens 720 are aspheric, and the second lens 720 is made of plastic.

The third lens 730 includes a visual-side surface 731 and an image source-side surface 732, the visual-side surface 731 of the third lens 730 is convex in a paraxial region thereof, the image source-side surface 732 of the third lens 730 is flat in a paraxial region thereof, the visual-side surface 731 of the third lens 730 is aspheric, and the third lens 730 is made of plastic.

The first optical layer 760 is located on the visual-side surface 711 of the first lens 710, and the configuration of the first optical layer 760 is the same as that of the first optical layer 160 of the first embodiment and will not be explained again.

The partial-reflective-partial-transmissive element 770 is located on the image source-side surface 712 of the first lens 710, and the configuration of the partial-reflective-partial-transmissive element 770 is the same as that of the partial-reflective-partial-transmissive element 170 of the first embodiment and will not be explained again.

The second optical layer 780 is located on the image source-side surface 732 of the third lens 730, and the configuration of the second optical layer 780 is the same as that of the second optical layer 180 of the first embodiment and will not be explained again.

The second element group E2 includes, in order from the visual side to the image source side along the optical axis 795: a second lens group G2 and an image source plane 791. The optical lens assembly works in cooperation with an image source 793 located on the image source plane 791. The type of the image source 793 may be a liquid crystal display, an OLED display, or a LED display, but is not limited thereto.

The second lens group G2 with positive refractive power includes only a fourth lens 740. The fourth lens 740 includes a visual-side surface 741 and an image source-side surface 742, the visual-side surface 741 of the fourth lens 740 is convex in a paraxial region thereof, the image source-side surface 742 of the fourth lens 740 is convex in a paraxial region thereof, the visual-side surface 741 and the image source-side surface 742 of the fourth lens 740 are spherical, and the fourth lens 740 is made of glass.

The detailed data of the seventh embodiment is shown in Tables 25-28.

TABLE 25

Near point: f_N(focal length) = 15.29 mm, EPD(entrance pupil diameter) = 10.00 mm, FOV_N(field of view) = 87.8
Far point: f_F(focal length) = 19.45 mm, EPD (entrance pupil diameter) = 10.00 mm, FOV_F(field of view) = 7 9.8

| Surface | | Curvature Radius | Thickness/gap | Refractive Index (nd) | Abbe number (vd) | Refraction/ reflection |
|---|---|---|---|---|---|---|
| 0 | Stop | infinity | 14.300(Near point) 6.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |

TABLE 25-continued

Near point: f_N(focal length) = 15.29 mm, EPD(entrance pupil diameter) = 10.00 mm, FOV_N(field of view) = 87.8
Far point: f_F(focal length) = 19.45 mm, EPD (entrance pupil diameter) = 10.00 mm, FOV_F(field of view) = 7 9.8

| Surface | | Curvature Radius | Thickness/gap | Refractive Index (nd) | Abbe number (vd) | Refraction/ reflection |
|---|---|---|---|---|---|---|
| 3 | First phase retarder | infinity | 0.100 | 1.533 | 56.0 | refraction |
| 4 | First lens | infinity | 3.876 | 1.544 | 55.9 | refraction |
| 5 | Partial-reflective-partial-transmissive element | −55.547 | −3.876 | mirror | | reflection |
| 6 | First phase retarder | infinity | −0.100 | 1.533 | 56.0 | refraction |
| 7 | Reflective polarizer | infinity | −0.100 | 1.533 | 56.0 | refraction |
| 8 | Reflective polarizer | infinity | 0.100 | mirror | | reflection |
| 9 | First phase retarder | infinity | 0.100 | 1.533 | 56.0 | refraction |
| 10 | First lens | infinity | 3.876 | 1.544 | 55.9 | refraction |
| 11 | Partial-reflective-partial-transmissive element | −55.547 | 1.325 | — | — | refraction |
| 12 | Second lens | −13.825 | 3.598 | 1.657 | 20.9 | refraction |
| 13 | | −29.897 | 0.300 | — | — | refraction |
| 14 | Third lens | 22.598 | 5.015 | 1.544 | 55.9 | refraction |
| 15 | Second phase retarder | infinity | 0.100 | 1.533 | 56.0 | refraction |
| 16 | Second absorptive polarizer | infinity | 0.100 | 1.533 | 56.0 | refraction |
| 17 | | infinity | 0.300(Near point) 8.589(Far point) | — | — | refraction |
| 18 | Fourth lens | 44.660 | 5.000 | 1.755 | 52.3 | refraction |
| 19 | | −59.847 | 1.000 | — | — | refraction |
| 20 | Image source plane | infinity | — | — | — | — |

Note:
the reference wavelength is 530 nm

TABLE 26

| Surface | 4, 10 | 5, 11 | 12 | 13 |
|---|---|---|---|---|
| K: | 0.0000E+00 | −1.8871E+00 | −1.0572E+00 | 0.0000E+00 |
| A2 | 0.0000E+00 | 0.0000E+00 | 0.0000E+00 | 0.0000E+00 |
| A4: | 0.0000E+00 | 2.7408E−06 | 3.2821E−04 | 2.0313E−04 |
| A6: | 0.0000E+00 | −4.5167E−08 | −2.6662E−06 | 5.5120E−07 |
| A8: | 0.0000E+00 | 1.8739E−10 | 1.4881E−08 | −2.5284E−08 |
| A10: | 0.0000E+00 | −2.0052E−13 | −5.5888E−11 | 2.6460E−10 |
| A12: | 0.0000E+00 | 0.0000E+00 | 1.2740E−13 | −1.4469E−12 |
| A14: | 0.0000E+00 | 0.0000E+00 | −1.2649E−16 | 4.0179E−15 |
| A16: | 0.0000E+00 | 0.0000E+00 | 0.0000E+00 | −4.4076E−18 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 14 | 15 | 17 | 18 |
|---|---|---|---|---|
| K: | −9.0917E+00 | 0.0000E+00 | 0.0000E+00 | 0.0000E+00 |
| A2: | 0.0000E+00 | 0.0000E+00 | 0.0000E+00 | 0.0000E+00 |
| A4: | 1.5268E−05 | 0.0000E+00 | 0.0000E+00 | 0.0000E+00 |
| A6: | 1.1064E−06 | 0.0000E+00 | 0.0000E+00 | 0.0000E+00 |
| A8: | −2.1552E−08 | 0.0000E+00 | 0.0000E+00 | 0.0000E+00 |
| A10: | 2.0862E−10 | 0.0000E+00 | 0.0000E+00 | 0.0000E+00 |
| A12: | −1.1074E−12 | 0.0000E+00 | 0.0000E+00 | 0.0000E+00 |
| A14: | 2.9316E−15 | 0.0000E+00 | 0.0000E+00 | 0.0000E+00 |
| A16: | −3.0071E−18 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 27

| f_N [mm] | 15.29 | FOV_mn [°] | 79.8 | LBS [mm] | 4.18 |
|---|---|---|---|---|---|
| f_F [mm] | 19.45 | GCT1 [mm] | 14.41 | G1R1 [mm] | infinity |
| f_G1 [mm] | 83.29 | GCT2 [mm] | 5.00 | G1R2 [mm] | infinity |
| f_G2 [mm] | 34.36 | MS1_N [mm] | 20.91 | G2R1 [mm] | 44.66 |
| GT12_N [mm] | 0.30 | MS1_F [mm] | 29.20 | G2R2 [mm] | −59.85 |
| GT12_F [mm] | 8.59 | MS2_N [mm] | 6.50 | R_BS [mm] | −55.55 |
| FOV_mx [°] | 87.8 | MS2_F [mm] | 14.79 | IMH [mm] | 12.60 |

TABLE 28

| f_G1/f_G2 | 2.42 | GCT2/GCT1 | 0.35 |
|---|---|---|---|
| f_N/f_G1 | 0.18 | R_BS/(2*MS1_N) | −1.33 |
| f_N/f_F | 0.79 | MS2_F/f_G2 | 0.43 |
| f_N*MS1_F/(f_F*IMH) | 1.82 | GCT2/G2R2 | −0.08 |
| (f_F-f_N)/(GT12_F-GT12_N) | 0.50 | f_G1/G1R2 | 0 |
| GCT1/LBS | 3.45 | f_G2/G2R1 | 0.77 |
| MS2_F/f_G1 | 0.18 | FOV_mx/FOV_mn | 1.10 |
| MS2_F/GCT2 | 2.96 | MS1_F/MS1_N | 1.40 |
| MS1_N/f_N | 1.37 | — | — |

In the seventh embodiment, the curve equation of the aspheric surface profiles of the aforementioned lenses is the same as the curve equation of the aspheric surface profiles of the aforementioned lenses in the first embodiment. The values of the parameters in Table 27 can be calculated from Tables 25 and 26, and meets the conditions in Table 28.

Eighth Embodiment

Referring to FIGS. 8A and 8B, an optical lens assembly in accordance with an eighth embodiment of the present invention includes, in order from a visual side to an image source side along an optical axis 895: a stop 800, a first element group E1 and a second element group E2. The stop 800 may be located in a position where the user's eyes view the virtual image. When the focus of the optical lens assembly changes from a near point to a far point, the second element group E2 moves from the visual side to the image source side relative to the first element group E1. The optical lens assembly has a total of five lenses with refractive power, but is not limited thereto.

The first element group E1 includes a first lens group G1, a first optical layer 860, a partial-reflective-partial-transmissive element 870 and a second optical layer 880.

The first lens group G1 with positive refractive power includes, in order from the visual side to the image source side along the optical axis 895: a first lens 810, a second lens 820 and a third lens 830.

The first lens 810 includes a visual-side surface 811 and an image source-side surface 812, the visual-side surface 811 of the first lens 810 is flat in a paraxial region thereof, the image source-side surface 812 of the first lens 810 is convex in a paraxial region thereof, the image source-side surface 812 of the first lens 810 is aspheric, and the first lens 810 is made of plastic.

The second lens 820 includes a visual-side surface 821 and an image source-side surface 822, the visual-side surface 821 of the second lens 820 is concave in a paraxial region thereof, the image source-side surface 822 of the second lens 820 is flat in a paraxial region thereof, the visual-side surface 821 of the second lens 820 is aspheric, and the second lens 820 is made of glass.

The third lens 830 includes a visual-side surface 831 and an image source-side surface 832, the visual-side surface 831 of the third lens 830 is convex in a paraxial region thereof, the image source-side surface 832 of the third lens 830 is convex in a paraxial region thereof, the visual-side surface 831 and the image source-side surface 832 of the third lens 830 are aspheric, and the third lens 830 is made of plastic.

The first optical layer 860 is located on the visual-side surface 811 of the first lens 810, and the configuration of the first optical layer 860 is the same as that of the first optical layer 160 of the first embodiment and will not be explained again.

The partial-reflective-partial-transmissive element 870 is located on the image source-side surface 812 of the first lens 810, and the configuration of the partial-reflective-partial-transmissive element 870 is the same as that of the partial-reflective-partial-transmissive element 170 of the first embodiment and will not be explained again.

The second optical layer 880 is located on the image source-side surface 822 of the second lens 820, and the configuration of the second optical layer 880 is the same as that of the second optical layer 180 of the first embodiment and will not be explained again.

The second element group E2 includes, in order from the visual side to the image source side along the optical axis 895: a second lens group G2 and an image source plane 891. The optical lens assembly works in cooperation with an image source 893 located on the image source plane 891. The type of the image source 893 may be a liquid crystal display, an OLED display, or a LED display, but is not limited thereto.

The second lens group G2 with positive refractive power includes, in order from the visual side to the image source side along the optical axis 895: a fourth lens 840 and a fifth lens 850.

The fourth lens 840 includes a visual-side surface 841 and an image source-side surface 842, the visual-side surface 841 of the fourth lens 840 is flat in a paraxial region thereof, the image source-side surface 842 of the fourth lens 840 is convex in a paraxial region thereof, the image source-side surface 842 of the fourth lens 840 is spherical, and the fourth lens 840 is made of glass.

The fifth lens 850 includes a visual-side surface 851 and an image source-side surface 852, the visual-side surface 851 of the fifth lens 850 is concave in a paraxial region thereof, the image source-side surface 852 of the fifth lens 850 is convex in a paraxial region thereof, the visual-side surface 851 and the image source-side surface 852 of the fifth lens 850 are spherical, and the fifth lens 850 is made of glass. The fourth lens 840 and the fifth lens 850 together form a cemented lens.

The detailed data of the eighth embodiment is shown in Tables 29-32.

TABLE 29

Near point: f_N(focal length) = 16.16 mm, EPD(entrance
pupil diameter) = 10.00 mm, FOV_N(field of view) = 89.7°
Far point: f_F(focal length) = 19.42 mm, EPD (entrance
pupil diameter) = 10.00 mm, FOV_F(field of view) = 92.4°

| Surface | | Curvature Radius | Thickness/gap | Refractive Index (nd) | Abbe number (vd) | Refraction/ reflection |
|---|---|---|---|---|---|---|
| 0 | Stop | infinity | 12.000(Near point) 12.000(Far point) | — | — | — |
| 1 | First absorptive polarizer | infinity | 0.100 | 1.533 | 56.0 | refraction |
| 2 | Reflective polarizer | infinity | 0.100 | 1.533 | 56.0 | refraction |
| 3 | First phase retarder | infinity | 0.100 | 1.533 | 56.0 | refraction |
| 4 | First lens | infinity | 3.773 | 1.544 | 55.9 | refraction |
| 5 | Partial-reflective-partial-transmissive element | −59.970 | −3.773 | mirror | | reflection |
| 6 | First phase retarder | infinity | −0.100 | 1.533 | 56.0 | refraction |
| 7 | Reflective polarizer | infinity | −0.100 | 1.533 | 56.0 | refraction |
| 8 | Reflective polarizer | infinity | 0.100 | mirror | | reflection |
| 9 | First phase retarder | infinity | 0.100 | 1.533 | 56.0 | refraction |
| 10 | First lens | infinity | 3.773 | 1.544 | 55.9 | refraction |
| 11 | Partial-reflective-partial-transmissive element | −59.970 | 0.827 | — | — | refraction |
| 12 | Second lens | −34.222 | 2.290 | 1.657 | 20.9 | refraction |
| 13 | Second phase retarder | infinity | 0.100 | 1.533 | 56.0 | refraction |
| 14 | Second absorptive polarizer | infinity | 0.100 | 1.533 | 56.0 | refraction |
| 15 | | infinity | 0.300 | — | — | refraction |
| 16 | Third lens | 63.247 | 5.372 | 1.544 | 55.9 | refraction |
| 17 | | −25.644 | 0.300(Near point) 9.531(Far point) | — | — | refraction |
| 18 | Fourth lens | infinity | 6.420 | 1.755 | 52.3 | refraction |
| 19 | Fifth lens | −22.118 | 1.500 | 1.847 | 23.8 | refraction |
| 20 | | −36.789 | 1.000 | — | — | refraction |
| 21 | Image source plane | infinity | — | — | — | — |

Note:
the reference wavelength is 530 nm

TABLE 30

| Surface | 4, 10 | 5, 11 | 12 | 13 | 15 |
|---|---|---|---|---|---|
| K: | 0.0000E+00 | −1.4993E+00 | −3.6861E+00 | 0.0000E+00 | 0.0000E+00 |
| A2: | 0.0000E+00 | 0.0000E+00 | 0.0000E+00 | 0.0000E+00 | 0.0000E+00 |
| A4: | 0.0000E+00 | −2.2048E−07 | 8.6353E−06 | 0.0000E+00 | −8.2644E−06 |
| A6: | 0.0000E+00 | 8.7945E−09 | −1.1789E−07 | 0.0000E+00 | 5.1110E−07 |
| A8: | 0.0000E+00 | −1.4506E−10 | 2.7697E−09 | 0.0000E+00 | −7.2111E−09 |
| A10: | 0.0000E+00 | 1.1551E−12 | −2.4497E−11 | 0.0000E+00 | 4.1687E−11 |
| A12: | 0.0000E+00 | −4.8981E−15 | 1.0951E−13 | 0.0000E+00 | −1.4427E−13 |
| A14: | 0.0000E+00 | 1.1310E−17 | −2.4749E−16 | 0.0000E+00 | 2.6241E−16 |
| A16: | 0.0000E+00 | −1.0178E−20 | 2.2975E−19 | 0.0000E+00 | −1.4036E−19 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

| Surface | 16 | 18 | 19 | 20 | — |
|---|---|---|---|---|---|
| K: | 1.0836E+00 | 0.0000E+00 | 0.0000E+00 | 0.0000E+00 | — |
| A2: | 0.0000E+00 | 0.0000E+00 | 0.0000E+00 | 0.0000E+00 | — |
| A4: | 8.6123E−05 | 0.0000E+00 | 0.0000E+00 | 0.0000E+00 | — |
| A6: | 1.6941E−07 | 0.0000E+00 | 0.0000E+00 | 0.0000E+00 | — |
| A8: | −2.8118E−09 | 0.0000E+00 | 0.0000E+00 | 0.0000E+00 | — |
| A10: | 4.6060E−13 | 0.0000E+00 | 0.0000E+00 | 0.0000E+00 | — |
| A12: | 8.0766E−14 | 0.0000E+00 | 0.0000E+00 | 0.0000E+00 | — |
| A14: | −3.5946E−16 | 0.0000E+00 | 0.0000E+00 | 0.0000E+00 | — |
| A16: | 5.4668E−19 | 0.0000E+00 | 0.0000E+00 | 0.0000E+00 | — |
| A18: | 0.0000E+00 | 0.0000E+00 | 0.0000E+00 | 0.0000E+00 | — |
| A20: | 0.0000E+00 | 0.0000E+00 | 0.0000E+00 | 0.0000E+00 | — |

TABLE 31

| f_N [mm] | 16.16 | FOV_mn [°] | 89.7 | LBS [mm] | 4.07 |
|---|---|---|---|---|---|
| f_F [mm] | 19.42 | GCT1 [mm] | 13.06 | G1R1 [mm] | infinity |
| f_G1 [mm] | 49.53 | GCT2 [mm] | 7.92 | G1R2 [mm] | −25.64 |
| f_G2 [mm] | 52.75 | MS1_N [mm] | 22.28 | G2R1 [mm] | infinity |
| GT12_N [mm] | 0.30 | MS1_F [mm] | 31.51 | G2R2 [mm] | −36.79 |
| GT12_F [mm] | 9.53 | MS2_N [mm] | 9.22 | R_BS [mm] | −59.97 |
| FOV_mx [°] | 92.4 | MS2_F [mm] | 18.45 | IMH [mm] | 12.60 |

TABLE 32

| f_G1/f_G2 | 0.94 | GCT2/GCT1 | 0.61 |
|---|---|---|---|
| f_N/f_G1 | 0.33 | R_BS/(2*MS1_N) | −1.35 |
| f_N/f_F | 0.83 | MS2_F/f_G2 | 0.35 |
| f_N*MS1_F/(f_F*IMH) | 2.08 | GCT2/G2R2 | −0.22 |
| (f_F-f_N)/(GT12_F-GT12_N) | 0.35 | f_G1/G1R2 | −1.93 |
| GCT1/LBS | 3.21 | f_G2/G2R1 | 0 |
| MS2_F/f_G1 | 0.37 | FOV_mx/FOV_mn | 1.03 |
| MS2_F/GCT2 | 2.33 | MS1_F/MS1_N | 1.41 |
| MS1_N/f_N | 1.38 | — | — |

In the eighth embodiment, the curve equation of the aspheric surface profiles of the aforementioned lenses is the same as the curve equation of the aspheric surface profiles of the aforementioned lenses in the first embodiment. The values of the parameters in Table 31 can be calculated from Tables 29 and 30, and meets the conditions in Table 32.

For the optical lens assembly in the present invention, the lenses can be made of plastic or glass. If a lens is made of plastic, it is conducive to reducing the manufacturing cost. If a lens is made of glass, it is conducive to enhancing the degree of freedom in the arrangement of refractive power of the optical lens assembly. Moreover, one or both of the visual-side and image source-side surfaces of one or more lenses of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the present optical lens assembly, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in head-mounted electronic devices as required. FIG. 9 shows a head-mounted electronic device in accordance with an embodiment of the present invention. The head-mounted electronic device 9 is a head-mounted display device using, but not limited to, virtual reality (VR) technology, and includes a housing 910, an optical module 920, a controller 940 and an image source 993.

The optical module 920 corresponds to the left and right eyes of the user. The optical module 920 includes an optical lens assembly described in any one of the first to eighth embodiments.

The image source 993 corresponds to the left and right eyes of the user, and the type of the image source 930 may be a liquid crystal display, OLED display, or LED display, but is not limited thereto.

The controller 940 is electrically connected to the image source 993, so as to control the image source 993 to display an image, whereby the head-mounted electronic device 9 can project the image to the eyes of the user to form a virtual image.

What is claimed is:

1. An optical lens assembly comprising:
a first element group comprising:
a first lens group with positive refractive power, comprising one, two, or three lenses;
a first optical layer being located on a visual-side surface of the lens of the first lens group which is closest to a visual side, and comprising, in order from the visual side to an image source side: a first absorptive polarizer, a reflective polarizer and a first phase retarder; and
a partial-reflective-partial-transmissive element;
a second element group comprising:
a second lens group comprising one, two, or three lenses; and
an image source plane; and
a second optical layer being located between the partial-reflective-partial-transmissive element and the image source plane and comprising, in order from the visual side to the image source side: a second phase retarder and a second absorptive polarizer,
wherein the first element group and the second element group are arranged in order from the visual side to the image source side; and a focal length of the optical lens assembly focusing on a near point is f_N, a focal length of the first lens group is f_G1, a focal length of the second lens group is f_G2, a radius of curvature of a visual-side surface of the lens of the second lens group which is closest to the visual side is G2R1, and the following conditions are satisfied: −0.17<f_G1/f_G2<3.27, 0.11<f_N/f_G1<0.39, and −1.00<f_G2/G2R1<12.27.

2. The optical lens assembly as claimed in claim 1, wherein the focal length of the optical lens assembly focusing on the near point is f_N, a focal length of the optical lens assembly focusing on a far point is f_F, and the following condition is satisfied: 0.63<f_N/f_F<1.20.

3. The optical lens assembly as claimed in claim 1, wherein the focal length of the optical lens assembly focusing on the near point is f_N, a focal length of the optical lens assembly focusing on a far point is f_F, a distance from a visual-side surface of the first absorptive polarizer to the image source plane along an optical axis when the optical lens assembly focuses on the far point is MS1_F, a maximum image-source height of the optical lens assembly is IMH, and the following condition is satisfied: 0.91<f_N*MS1_F/(f_F*IMH)<2.50.

4. The optical lens assembly as claimed in claim 1, wherein the focal length of the optical lens assembly focusing on the near point is f_N, a focal length of the optical lens assembly focusing on a far point is f_F, a distance from an image source-side surface of the lens of the first lens group which is closest to the image source side, to a visual-side surface of the lens of the second lens group which is closest to the visual side, along an optical axis when the optical lens assembly focuses on the near point is GT12_N, a distance from the image source-side surface of the lens of the first lens group which is closest to the image source side, to a visual-side surface of the lens of the second lens group which is closest to the visual side, along the optical axis when the optical lens assembly focuses on the far point is GT12_F, and the condition is satisfied: −0.04<following (f_F-f_N)/(GT12_F−GT12_N)<0.60.

5. The optical lens assembly as claimed in claim 1, wherein a distance from a visual-side surface of the first absorptive polarizer to an image source-side surface of the lens of the first lens group which is closest to the image source side, along the optical axis is GCT1, a distance from the first absorptive polarizer to the partial-reflective-partial-transmissive element along the optical axis is LBS, and the following condition is satisfied: $0.80<\text{GCT1/LBS}<5.01$.

6. The optical lens assembly as claimed in claim 1, wherein the focal length of the first lens group is f_G1, a distance from an image source-side surface of the lens of the first lens group which is closest to the image source side, to the image source plane along an optical axis when the optical lens assembly focuses on a far point is MS2_F, and the following condition is satisfied: $0.08<\text{MS2\_F/}$ f_G1$<0.45$.

7. The optical lens assembly as claimed in claim 1, wherein a distance from an image source-side surface of the lens of the first lens group which is closest to the image source side, to the image source plane along an optical axis when the optical lens assembly focuses on a far point is MS2_F, a distance from a visual-side surface of the lens of the second lens group which is closest to the visual side, to an image source-side surface of the lens of the second lens group which is closest to the image source side, along the optical axis is GCT2, and the following condition is satisfied: $0.98<\text{MS2\_F/GCT2}<4.20$.

8. The optical lens assembly as claimed in claim 1, wherein the focal length of the optical lens assembly focusing on the near point is f_N, a distance from a visual-side surface of the first absorptive polarizer to the image source plane along an optical axis when the optical lens assembly focuses on the near point is MS1_N, and the following condition is satisfied: $0.61<\text{MS1\_N/f\_N}<1.68$.

9. The optical lens assembly as claimed in claim 1, wherein a distance from a visual-side surface of the first absorptive polarizer to an image source-side surface of the lens of the first lens group which is closest to the image source side, along an optical axis is GCT1, a distance from a visual-side surface of the lens of the second lens group which is closest to the visual side, to an image source-side surface of the lens of the second lens group which is closest to the image source side, along the optical axis is GCT2, and the following condition is satisfied: $0.23<\text{GCT2/}$ GCT1$<1.86$.

10. The optical lens assembly as claimed in claim 1, wherein a radius of curvature of a reflective surface of the partial-reflective-partial-transmissive element is R_BS, a distance from a visual-side surface of the first absorptive polarizer to the image source plane along the optical axis when the optical lens assembly focuses on the near point is MS1_N, and the following condition is satisfied: $-3.55<\text{R\_BS/(2*MS1\_N)}<-1.02$.

11. The optical lens assembly as claimed in claim 1, wherein the focal length of the second lens group is f_G2, a distance from an image source-side surface of the lens of the first lens group which is closest to the image source side, to the image source plane along an optical axis when the optical lens assembly focuses on a far point is MS2_F, and the following condition is satisfied: $-0.02<\text{MS2\_F/}$ f_G2$<0.62$.

12. The optical lens assembly as claimed in claim 1, wherein a distance from a visual-side surface of the lens of the second lens group which is closest to the visual side, to an image source-side surface of the lens of the second lens group which is closest to the image source side, along an optical axis is GCT2, a radius of curvature of the image source-side surface of the lens of the second lens group which is closest to the image source side is G2R2, and the following condition is satisfied: $-0.26<\text{GCT2/G2R2}<0.01$.

13. The optical lens assembly as claimed in claim 1, wherein the focal length of the first lens group is f_G1, a radius of curvature of an image source-side surface of the lens of the first lens group which is closest to the image source side is G1R2, and the following condition is satisfied: $-2.32<\text{f\_G1/G1R2}<0$.

14. The optical lens assembly as claimed in claim 1, wherein a maximum field of view of the optical lens assembly in a zoom range is FOV_mx, a minimum field of view of the optical lens assembly in the zoom range is FOV_mn, and the following condition is satisfied: $0.80<\text{FOV\_mx/FOV\_mn}<1.52$.

15. The optical lens assembly as claimed in claim 1, wherein a distance from a visual-side surface of the first absorptive polarizer to the image source plane along an optical axis when the optical lens assembly focuses on the near point is MS1_N, a distance from the visual-side surface of the first absorptive polarizer to the image source plane along the optical axis when the optical lens assembly focuses on a far point is MS1_F, and the following condition is satisfied: $0.81<\text{MS1\_F/MS1\_N}<1.78$.

16. The optical lens assembly as claimed in claim 1, wherein when a focus of the optical lens assembly changes from a near point to a far point, the first element group moves relative to the second element group along the optical axis.

17. A head-mounted electronic device comprising:
a housing;
the optical lens assembly of claim 1 being disposed in the housing;
an image source being disposed on an image source plane of the optical lens assembly in the housing; and
a controller being disposed in the housing and electrically connected to the image source.

18. An optical lens assembly comprising: a first element group comprising:
a first element group comprising:
a first lens group with positive refractive power, comprising one, two, or three lenses;
a first optical layer being located on a visual-side surface of the lens of the first lens group which is closest to a visual side, and comprising, in order from the visual side to an image source side: a first absorptive polarizer, a reflective polarizer and a first phase retarder; and
a partial-reflective-partial-transmissive element;
a second element group comprising:
a second lens group comprising one, two, or three lenses; and
an image source plane; and
a second optical layer being located between the partial-reflective-partial-transmissive element and the image source plane and comprising, in order from the visual side to the image source side: a second phase retarder and a second absorptive polarizer,
wherein the first element group and the second element group are arranged in order from the visual side to the image source side;
when a focus of the optical lens assembly changes from a near point to a far point, the first element group moves relative to the second element group along the optical axis; and
a focal length of the second lens group is f_G2, a radius of curvature of a visual-side surface of the lens of the second lens group which is closest to the visual side is G2R1, and the following condition is satisfied:

$$-1.00 < f\_G2/G2R1 < 12.27.$$

\* \* \* \* \*